(12) United States Patent
Tsubaki et al.

(10) Patent No.: US 7,929,043 B2
(45) Date of Patent: Apr. 19, 2011

(54) IMAGE STABILIZING APPARATUS, IMAGE-PICKUP APPARATUS AND IMAGE STABILIZING METHOD

(75) Inventors: Hidetoshi Tsubaki, Utsunomiya (JP);
Mitsuhiro Saito, Utsunomiya (JP);
Takahiro Oshino, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 12/062,007

(22) Filed: Apr. 3, 2008

(65) Prior Publication Data
US 2008/0246848 A1 Oct. 9, 2008

(30) Foreign Application Priority Data

Apr. 6, 2007 (JP) ................... 2007-101162

(51) Int. Cl.
*H04N 5/232* (2006.01)
*H04N 5/228* (2006.01)
(52) U.S. Cl. ..................................... 348/348; 348/208.6
(58) Field of Classification Search .................. 348/348, 348/208.1, 208.6
See application file for complete search history.

(56) References Cited

U.S. PATENT DOCUMENTS

| | | | | |
|---|---|---|---|---|
| 7,692,688 | B2 * | 4/2010 | Kurata | 348/208.5 |
| 2006/0017813 | A1 | 1/2006 | Okubo et al. | |
| 2007/0002145 | A1 * | 1/2007 | Furukawa | 348/207.99 |
| 2007/0195172 | A1 * | 8/2007 | Kurata | 348/208.99 |

FOREIGN PATENT DOCUMENTS

| | | |
|---|---|---|
| GB | 2429867 A | 3/2007 |
| JP | 2006-033759 A | 2/2006 |
| JP | 2007-221631 A | 8/2007 |

OTHER PUBLICATIONS

Extended European Search Report issued on Dec. 19, 2008 for European Patent Application No. 08006491.8.
Liang et al., Video Stabilization for a Camcorder Mounted on a Moving Vehicle, *IEEE Transactions on Vehicular Technology*, Nov. 1, 2004, pp. 1636-1648, vol. 53, No. 6.
Matsushita et al., Full-frame Video Stabilization, *Proceedings of the 2005 IEEE Computer Soc. Conf. on Computer Vision and Pattern Recognition*, Jun. 20, 2005.
Z. Zhu et al., Camera Stabilization Based on 2.5D Motion Estimation and Inertial Motion Filtering, ICIV, 1998, pp. 329-334.
A. Litvin et al., Probabilistic video stabilization using Kalman filtering and mosaicking, Proceedings of SPIE, Jan. 20-24, 2003.
M. Irani et al., Recovery of Ego-Motion Using Image Stabilization, CVPR, Jun. 1994.

* cited by examiner

*Primary Examiner* — James M Hannett
(74) *Attorney, Agent, or Firm* — Canon U.S.A., Inc., IP Division

(57) ABSTRACT

An image stabilizing apparatus includes a motion vector calculating part that calculates a motion vector between a plurality of images including a displacement caused by a motion of an image-pickup apparatus, a shake-correction parameter calculating part that receives the motion vector as input to calculate a shake correction amount, and an image transforming part that performs geometric transformation of the image in accordance with the shake correction amount. The shake-correction parameter calculating part performs variation amount calculation, variation amount correction and correction amount calculation based on the motion information between the plurality of images. The image stabilizing apparatus preserves a motion in video from an intended camera work and allows image stabilization for an unintended shake.

20 Claims, 18 Drawing Sheets

IMAGE STABILIZING APPARATUS, IMAGE-PICKUP APPARATUS AND IMAGE STABILIZING METHOD

BACKGROUND OF THE INVENTION

The present invention relates to an image stabilizing apparatus and an image stabilizing method for performing image-stabilization processing in moving images. The present invention also relates to an image-pickup apparatus on which the image stabilizing apparatus is mounted.

Image stabilizing techniques involving image processing for reducing shakes of video (moving image) due to camera shakes are widely used in image-pickup apparatuses for moving images such as video cameras. Especially when an image-pickup optical system of a long focal length is used to pick up images, a slight camera shake leads to a violent shake of video and thus an image stabilizing function is essential for the camera. Even for an image-pickup optical system of a short focal length, effective operation of the image stabilizing function is desirable when a user attempts to pick up an object image while the user is moving.

When picking up images while the use is moving, an advanced image stabilizing function is necessary in which an unintended camera shake is discriminated from an intended camera work and only the image shake due to the camera shake is suppressed. Already proposed image stabilizing techniques for supporting such movement include use of inertial motion filtering (see, Z. Zhu, et al. "Camera stabilization based on 2.5D motion estimation and inertial filtering," ICIV, 1998), and use of low-order model fitting (see, A. Litvin, J. Konrad, W. C. Karl, "Probabilistic video stabilization using Kalman filtering and mosaicking," Proceedings of SPIE. Jan. 20-24, 2003).

In these image stabilizing techniques, an approximation model such as a translation model and a Helmert model (similarity model) is used in motion estimation from images (estimation of a global motion or a camera work). A motion estimate value is given as one-dimensional time-series data set corresponding to camera work components such as horizontal translation, vertical translation, in-plane rotation, scaling, and shear. Thus, a filtering mechanism such as an inertial filter and a Kalman filter, which receives as input the one-dimensional time-series data set for use in signal processing can be used without any change.

Since motions in the image are in one-to-one correspondence with camera works, intended image stabilization is realized simply by causing the result of the filtering of the abovementioned motion amount determined from the image or the difference between the original motion amount and the filtering result to act on the image.

An image-pickup apparatus of a short focal length may be mounted on a walking robot, a helicopter, or a wearable camera which can violently shake. As the focal length is further reduced, motions appearing in a picked-up image are changed.

Specifically, the degree of the camera work allowable for a motion in the picked-up image is inversely proportional to the focal length, so that a motion referred to as "foreshortening" occurs which is not seen in video at an immediate focal length, thereby making it impossible to achieve image stabilization by the estimation of an image variation amount in the conventional approximation model and the image-stabilization processing. To address this, a proposal has been made in which the estimation of an image variation amount is performed with a projective model instead of the abovementioned approximation model and geometric correction in the image-stabilization processing is performed with projective transformation.

The abovementioned uses are based on the premise that the motion estimation is performed from the image and the image-stabilization processing is performed from a combination of image geometric transformation. In this case, it is necessary to accurately detect an image variation in response to a large and complicated camera work and to correct a large motion based on the movement of the user. However, it is difficult for only a motion sensor often used in the conventional image-stabilization processing to sense a multi-axis variation with high accuracy and at low cost. In addition, optical image-stabilization processing cannot correct violent shakes.

When image-stabilization processing of video which is picked up by a moving user is performed with the projective model, the following problems arise.

One of the problems is that the filtering method based on the conventional signal processing technique does not appropriately function as it is in the discrimination between an intended camera work and an unintended shake (motion). This is because a projective homography representing the image variation amount is a multi-dimensional amount represented by a matrix of 3×3.

One component of the projective homography is affected by a plurality of camera works. Thus, especially when a large forward camera work occurs, appropriate image stabilization cannot be achieved even when the camera work corresponds to a linear motion at a constant speed. This is because variation of each term component in terms of the homography is the linear sum of a non-linear image variation by the forward camera work and a linear image variation by a camera work such as translation and rotation that are perpendicular to an optical axis. As a result, even when filtering premised on a linear change is applied to each term of the projective homography, appropriate image-stabilization effects cannot be provided.

Second, one of the problems results from the extension of the estimation of the image variation amount and the image-stabilization processing to the projective model. The extension to the projective model allows detection of the image variation due to a large rotational camera work. Conversely, if the projective homography determined from motion vectors between frame images constituting video is inversely transformed directly or through the motion determination and then is used as a shake correction amount, appropriate image stabilization cannot be achieved. The image stabilizing method is widely used in image stabilization with the approximation model.

However, in the projective model, the influence of a translation camera work upon the image variation amount is relevant to the orientation of a reference plane associated with spatial distribution of motion vector extraction points in calculating a new projective homography. This causes the problem.

The relationship between a projective homography representing an image variation amount between frame images, a camera work, and a reference plane is expressed as follows:

$$H = R + \frac{1}{d}\vec{t}\vec{n}^T$$

where H represents the projective homography, R and $\vec{t}$ represent rotation and translation of the camera, respectively, and d and $\vec{n}$ represent the distance between the reference plane determined by the spatial positions of corresponding points and one camera, and the orientation of the normal to the reference plane, respectively.

Since the reference plane provided by the spatial positions of corresponding points for which a motion vector is extracted is often different from the position of a plane in space for which an observer wishes image stabilization, a problem arises. As seen from the abovementioned expression, the problem occurs only when the translation camera work is performed. For example, the problem involves distortion of the image in which an image plane is inclined in an advancing scene or an image plane is collapsed in a panning scene.

It is possible to adopt a compromise in which image stabilization is performed by using only triaxial rotation information of a camera work determined from a motion vector between frame images as proposed in Michal Irani, et al. "Recovery of Ego-Motion Using Image Stabilization," CVPR ('94), Seattle, June 1994. However, a camera work of a translation component from an up-and-down motion caused by a walking shake is not ignorable as a motion for which image stabilization should be performed.

BRIEF SUMMARY OF THE INVENTION

The present invention provides an image stabilizing apparatus and an image stabilizing method that preserve a motion in video from an intended camera work and allow image stabilization for an unintended shake.

As one aspect, the present invention provides an image stabilizing apparatus including a motion vector calculating part that calculates a motion vector between a plurality of images including a displacement caused by a motion of an image-pickup apparatus, a shake-correction parameter calculating part that receives the motion vector as input to calculate a shake correction amount, and an image transforming part that performs geometric transformation of the image in accordance with the shake correction amount. The shake-correction parameter calculating part includes a variation amount calculating part that calculates an image variation amount between the plurality of images based on the motion vector, a variation amount correcting part that calculates, based on the image variation amount, motion information in which a component distorting the image is excluded, and a correction amount calculating part that calculates the shake correction amount based on the motion information between the plurality of images.

As another aspect, the present invention provides an image stabilizing apparatus including a motion vector calculating part that calculates a motion vector that represents displacement of corresponding feature portions between a plurality of images, the displacement being caused by a motion of an image-pickup apparatus, a shake-correction parameter calculating part that receives the motion vector as input to calculate a shake correction amount, and an image transforming part that performs geometric transformation of the image in accordance with the shake correction amount. The shake-correction parameter calculating part includes a variation amount calculating part that calculates an image variation amount between the plurality of images based on the motion vector, a variation amount correcting part that calculates motion information based on the image variation amount between the plurality of images, and a correction amount calculating part that calculates the shake correction amount based on the motion information.

As still another aspect, the present invention provides an image-pickup apparatus including an image-pickup system that photoelectrically converts an object image to produce a plurality of frame images constituting video, and the above-described image stabilizing apparatus.

As yet still another aspect, the present invention provides an image-stabilizing method including a motion vector calculating step of calculating a motion vector between a plurality of images including a displacement caused by a motion of an image-pickup apparatus, a shake-correction parameter calculating step of receiving the motion vector as input to calculate a shake correction amount, and an image transforming step of performing geometric transformation of the image in accordance with the shake correction amount. The shake-correction parameter calculating step includes a variation amount calculating step of calculating an image variation amount between the plurality of images based on the motion vector, a variation amount correcting step of calculating, based on the image variation amount, motion information in which a component distorting the image is excluded, and a correction amount calculating step of calculating the shake correction amount based on the motion information between the plurality of images.

As further another aspect, the present invention provides an image-stabilizing method including a motion vector calculating step of calculating a motion vector that represents displacement of corresponding feature portions between a plurality of images, the displacement being caused by a motion of an image-pickup apparatus, a shake-correction parameter calculating step of receiving the motion vector as input to calculate a shake correction amount, and an image transforming step of performing geometric transformation of the image in accordance with the shake correction amount. The shake-correction parameter calculating step includes a variation amount calculating step of calculating an image variation amount between the plurality of images based on the motion vector, a variation amount correcting step of calculating motion information based on the image variation amount between the plurality of images, and a correction amount calculating step of calculating the shake correction amount based on the motion information.

As further still another aspect, the present invention provides a storage media storing a computer program that causes a computer to perform processing corresponding to the above-described image-stabilizing method.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Embodiment 1

Figure 1:
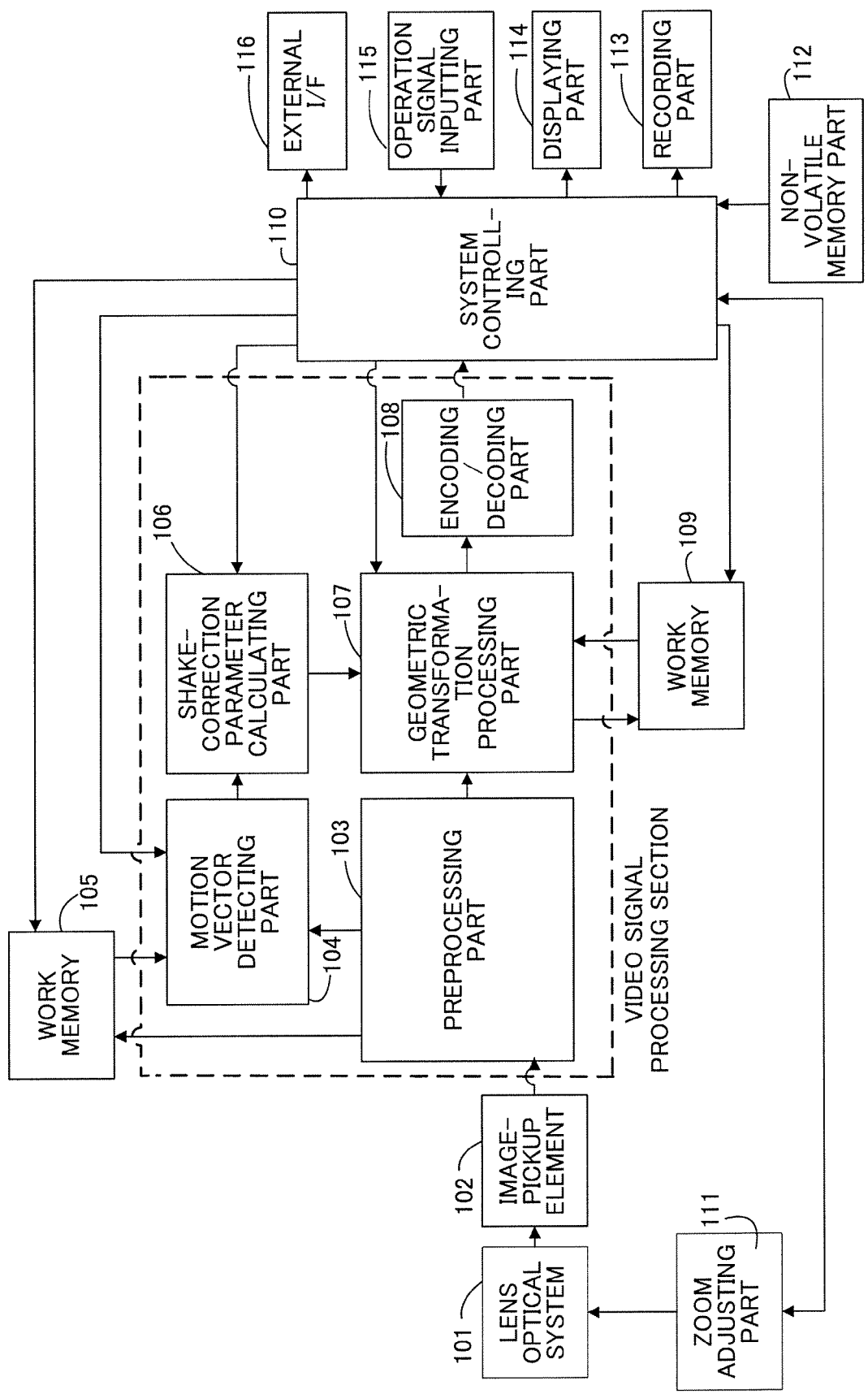
FIG. 1 is a diagram showing the configuration of a video camera which is Embodiments 1 to 4, 6, and 7 of the present invention.

FIG. 1 shows the configuration of a video camera (image-pickup apparatus) serving as a video input apparatus on which an image stabilizing apparatus which is Embodiment 1 of the present invention is mounted. In FIG. 1, reference numeral 101 shows a lens optical system serving as an image-pickup optical system and reference numeral 102 shows an image-pickup element such as a CCD sensor and a CMOS sensor.

Reference numeral 103 shows a preprocessing part, 104 a motion vector detecting part (motion vector calculating part), and 105 a work memory. Reference numeral 106 shows a shake-correction parameter calculating part, 107 a geometric transformation processing part (image transforming part), 108 an encoding/decoding part, and 109 a work memory. Reference numeral 110 shows a system controlling part, 111a a zoom adjusting part, 112 a non-volatile memory part, 113 a recording part, 114 a displaying part, 115 an operation signal inputting part, and 116 an external I/F.

The preprocessing part 103, the motion vector detecting part 104, the shake-correction parameter calculating part 106, the geometric transformation processing part 107, and the encoding/decoding part 108 constitute a video signal processing section. The video signal processing part forms a main part of the image stabilizing apparatus.

The lens optical system 101 includes a plurality of lenses and forms an optical image of an object (object image).

The image-pickup element 102 photoelectrically converts the optical image formed on a light-receiving surface by the lens optical system 101 into an image-pickup signal.

The preprocessing part 103 performs video processing on the image-pickup signal output from the image-pickup element 102 and outputs a video signal after the processing. The image-pickup element 102 and the preprocessing part 103 constitute an image-pickup system which photoelectrically converts the object image into the image (video). The video processing performed by the preprocessing part 103 includes auto-gain control, luminance/color difference separation, sharpening, white balance adjustment, black level adjustment, and calorimetric system transformation.

The motion vector detecting part 104 receives, as input, video frames (frame images) such as successive luminance frames, successive luminance and color difference frames, or successive RGB frames transformed from luminance and color difference frames provided by the preprocessing part 103. It may receive, as input, differential processing frames processed for motion vector detection or binary code frames.

The motion vector detecting part 104 detects motion vectors (motion information) between the successive frames input thereto. Specifically, it calculates the motion vector between a present frame image input from the preprocessing part 103, that is, a current frame, and a previous frame image input previously and accumulated in the work memory 105, that is, a past frame. The past frame is a frame subsequent to the current frame or a much older frame.

The work memory 105 is, for example, a so-called FIFO (first in, first out) memory. A delay amount of output is controlled on the basis of the number of memory blocks of the work memory 105.

Figure 2:
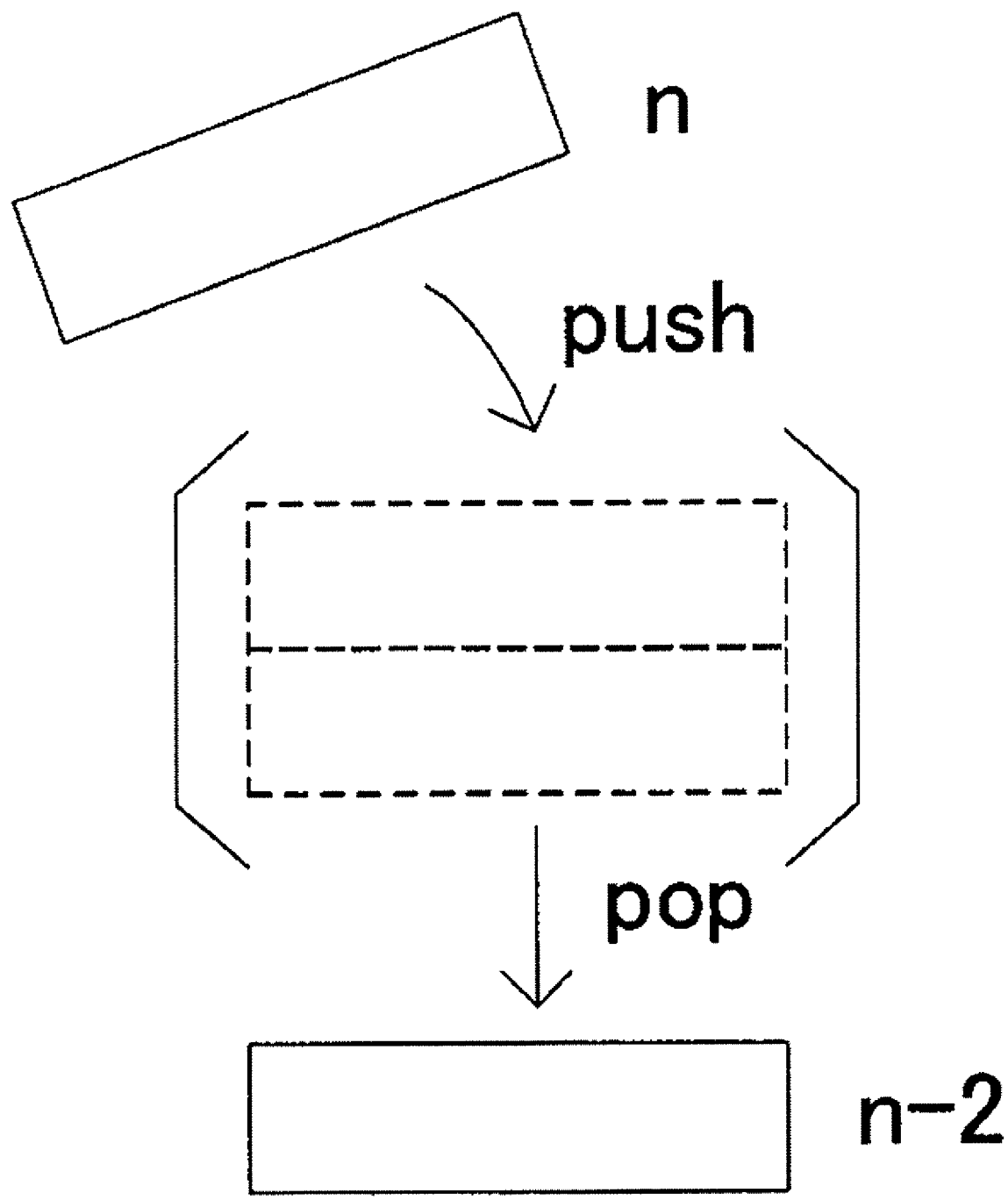
FIG. 2 is a schematic diagram for explaining the mechanism of a work memory in the embodiments.

FIG. 2 schematically shows a FIFO memory formed of two blocks. The FIFO memory is constituted with a list arrangement in terms of program, and insertion (push) operation and extraction (pop) operation are performed simultaneously. When the current frame is pushed as an n-th frame, the pop operation is simultaneously performed in which a previously pushed n−2th frame overflows and is output from the memory. If the number of memory block is three, an n−3th frame is output. In this manner, the number of memory blocks controls the delay relationship between the pushed frame and the popped frame.

The shake-correction parameter calculating part 106 receives, as input, the motion vector output from the motion vector detecting part 104 and camera calibration information such as in-camera parameters and a distortion coefficient provided by the system controlling part 110, later described, to calculate a shake correction amount. Although described later in detail, the shake-correction parameter calculating part 106 serves as a variation amount calculating part which calculates an image variation amount between a plurality of images (frame images) based on the motion vector and a variation amount correcting part which calculates, based on the image variation amount, motion information in which a component distorting the image is excluded. It also serves as a correction amount calculating part which calculates the shake correction amount based on the motion information between the frame images.

The in-camera parameters include a focal length, a pixel size of the image-pickup element 102, an image offset, and a shear amount.

The focal length is a focal length of the lens optical system 101 and is associated with a zoom state of the lens optical system 101 in picking up the frame images.

The pixel size of the image-pickup element 102 is a size of each pixel in horizontal and vertical directions.

The offset is provided to set the center of the image crossed by the optical axis of the lens optical system 101 on an image plane as the origin of image coordinates in contrast to a typical case where the upper-left point of the image is regarded as the origin.

The shear represents distortion of a pixel resulting from the shape of the pixel or the fact that the optical axis is not orthogonal to the image plane. The distortion coefficient represents a distortion amount due to aberration of the lens optical system 101.

The shake-correction parameter calculating part 106 outputs shake correction parameters including the calculated shake correction amount, the in-camera parameters, and the distortion coefficient.

The geometric transformation processing part 107 receives, as input, the shake correction parameters calculated by the shake-correction parameter calculating part 106 and the associated video frames to perform geometric transformation processing of the video frames. The shake correction parameters may be subjected to filtering processing or the like before the processing in this part 107, so that they may be delayed relative to the associated video frames. In this case, the video frames are once passed through the work memory 109 to match the video frames with the shake correction parameters. The work memory is a FIFO memory similar to the work memory 105.

The encoding/decoding part 108 encodes the video frame signal successively output from the geometric transformation processing part 107 in a video format such as NTSC and MPEG4. To reproduce a recorded and encoded video signal, the encoding/decoding part 108 decodes the video signal read out from the recording part 113 and displays it on the displaying part 114.

The system controlling part 110 transmits the video signal encoded in the abovementioned format and output from the encoding/decoding part 108 to the recording part 113 for recording. The system controlling part 110 also controls parameters of the processing blocks such as the motion vector detecting part 104, the shake-correction parameter calculating part 106, the geometric transformation processing part 107, and the encoding/decoding part 108. Initial values of the parameters are read out from the non-volatile memory part 112. The various parameters are displayed on the displaying part 114 and the values of the parameters can be changed with the operation signal inputting part 115 or a GUI.

The system controlling part 110 holds control parameters such as the number of the motion vectors, a search range of the motion vectors, and a template size for the motion vector detecting part 104. The system controlling part 110 provides the geometric transformation processing part 107 with control parameters such as the shake correction parameters calculated by the shake-correction parameter calculating part 106, and the in-camera parameters and distortion coefficient used in the calculation. The system controlling part 110 provides the encoding/decoding part 108 with control parameters such as an encoding format and a compression rate.

The system controlling part 110 performs control of the work memories 105 and 109 to control the delay amount of output. The system controlling part 110 also controls the zoom adjusting part 111 which performs zoom operation of the lens optical system 101. Specifically, the system controlling part 110 reads a zoom value representing a zoom state with an encoder in the zoom adjusting part 111. The system controlling part 110 uses a lookup table or a transforming expression showing the relationship between the zoom value and the focal length stored in the non-volatile memory part 112 to calculate and hold the focal length of the lens optical system 101 in an arbitrary zoom state.

The distortion coefficient varies depending on the focal length. Thus, the system controlling part 110 calculates the distortion coefficient corresponding to a focal length. Specifically, it uses a lookup table or a transforming expression showing the relationship between the focal length and the distortion coefficient stored in the non-volatile memory part 112 to calculate and hold the distortion coefficient in an arbitrary focal length. In addition, it reads and holds the in-camera parameters other than the focal length from the non-volatile memory part 112.

The in-camera parameters other than the focal length f include pixel sizes $k_u$, $k_v$ in horizontal and vertical directions, a shear amount $\phi$, and offset amounts $u_0$, $v_0$ in horizontal and vertical directions. The in-camera parameters are provided from camera design specifications or camera calibration. The system controlling part 110 transmits the in-camera parameters and the distortion coefficient to the shake-correction parameter calculating part 106.

The non-volatile memory part 112 stores the initial values of the control parameters necessary to system control for the motion vector detecting part 103, the shake-correction parameter calculating part 106, the encoding/decoding part 108, the preprocessing part 103, the image-pickup element 102 and the like. The control parameters include the in-camera parameters, the lookup table or the transforming expression showing the relationship between the zoom position (zoom value) and the focal length, and the lookup table or the transforming expression showing the relationship between the focal length and the distortion coefficient. The control parameters are read out by the system controlling part 110.

The recording part 113 performs writing (recording) and reading (reproduction) of the video signal encoded by the encoding/decoding part 108 to and from a recording medium on which the video signal can be recorded such as a semiconductor memory, a magnetic tape, and an optical disk.

The displaying part 114 is formed of a display element such as an LCD, an LED, and an EL. The displaying part 114 performs, for example, parameter setting display, alarm display, display of picked-up video data, and display of recorded video data read by the recording part 113. In reproducing the recorded video data, the encoded video signal is read from the recording part 113 and the read signal is transmitted the read signal to the encoding/decoding part 108 via the system controlling part 110. The recorded video data after it is decoded is displayed on the displaying part 114.

The operation signal inputting part 115 includes setting buttons for performing selection of functions and various settings in the camera from the outside and a button for instructing start and end of an image pick-up operation. The operation signal inputting part 115 may be integrated with the displaying part 114 by using a touch panel display.

The external I/F 116 receives an input signal from the outside instead of an operation signal input from the operation signal inputting part 115 or outputs the encoded video signal to an external device. The external I/F 116 is realized with an I/F protocol such as USB, IEEE1394, and wireless LAN. It can receive from the outside a video signal including information necessary for image stabilization such as the focal length or the zoom state in image-pickup operation, the in-camera parameters, and the distortion coefficient to allow image stabilization processing for recorded video.

Figure 3:
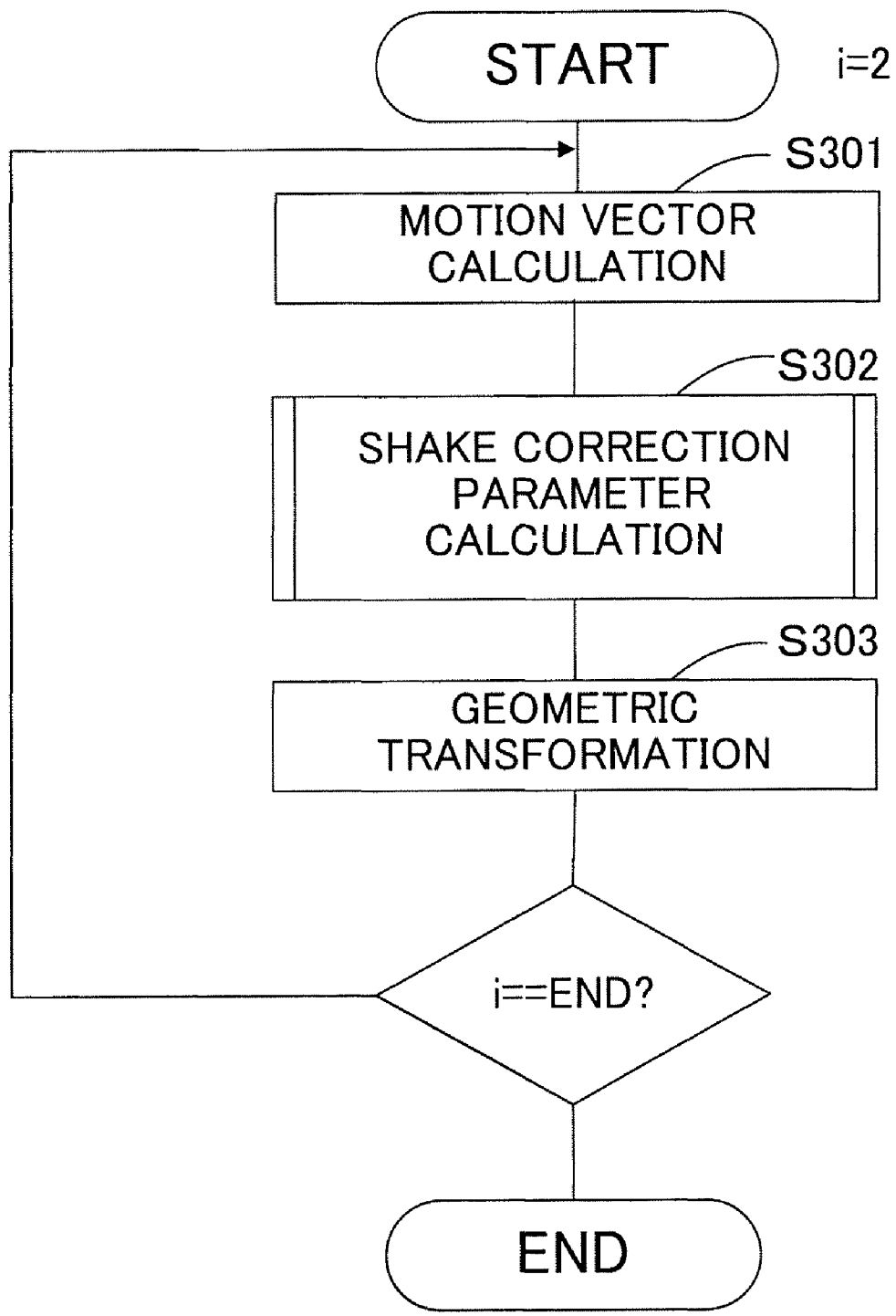
FIG. 3 is a flow chart showing an image stabilization processing procedure in Embodiment 1.

FIG. 3 shows an image stabilization processing procedure in Embodiment 1. The image-stabilization processing includes a motion vector calculating step, a shake-correction parameter calculating step, and a geometric transformation processing step, and is repeated for the input video frames. The motion vector calculating step, the shake-correction parameter calculating step, and the geometric transformation processing step are performed by the motion vector detecting part 104, the shake-correction parameter calculating part 106, and the geometric transformation processing part 107, respectively. The processing in each part is controlled with a computer program (image stabilizing program) stored in the system controlling part 110.

S (step) 301 is the motion vector calculating step. At this step, the motion vectors are calculated between the current frame directly input from the preprocessing part 103 and the past frame input from the work memory 105. In the calculation of the motion vectors, template matching or matching by a gradient method is performed.

Figure 4:
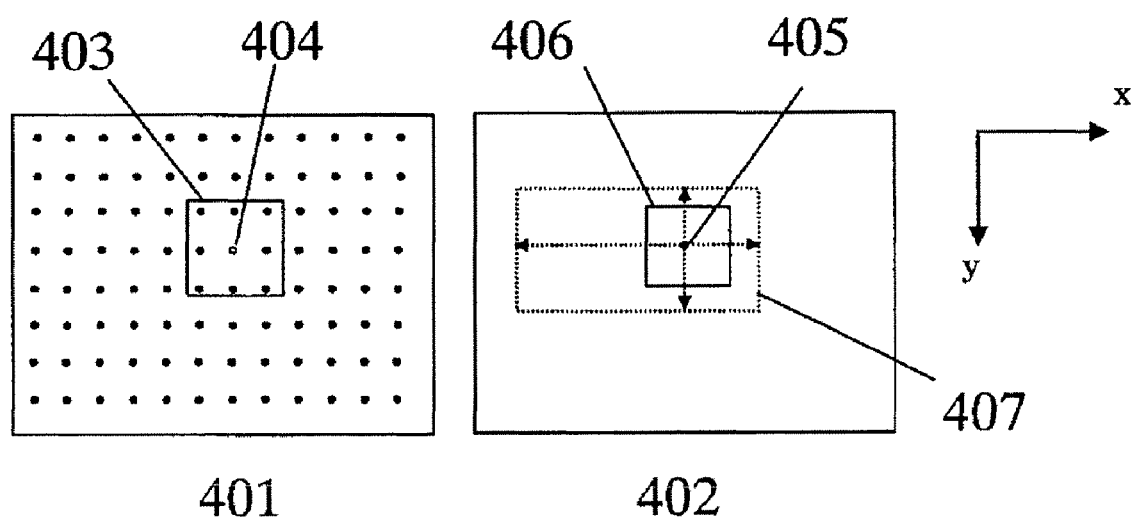
FIG. 4 is a diagram for explaining block matching performed in Embodiment 1.

FIG. 4 shows an example of block matching which is a type of the template matching. A video frame (frame image) 401 on the left is used as a reference image, while a video frame (frame image) 402 on the right is used as a search image. For example, the previously input past frame is used as the reference image and the current frame input after that is used as the search image to detect the motion vectors. A template 403 is defined in the left image 401 as a partial area of a predetermined size including points arranged in a grid pattern in which an attention point 404 is located at the center. An arbitrary search area 407 is set in the right image 402. While the search area 407 is gradually shifted, the position best matching the template 403 is searched for.

Specifically, similarity is calculated between an area 406 including the attention pixel 405 as a reference in the right image 402 and the template 403 in the left image 401. SSD (Sum of Square Difference), SAD (Sum of Absolute Difference), the result of correlation calculation such as normalized cross-correlation can be used as the index of the similarity. When the luminance significantly varies between frames as in video taken from a real scene, the normalized cross-correlation is mainly used. The following is the expression for calculating the similarity score in the normalized cross-correlation:

$$R(x, y, x', y') = \frac{\sum_{i=-M_T}^{M_T} \sum_{j=-N_T}^{N_T} \{I_{(x,y)}(i, j) - \bar{I}\}\{I'_{(x',y')}(i, j) - \bar{I}'\}}{\sqrt{\sum_{i=-M_T}^{M_T} \sum_{j=-N_T}^{N_T} \{I_{(x,y)}(i, j) - \bar{I}\}^2} \sqrt{\sum_{i=-M_T}^{M_T} \sum_{j=-N_T}^{N_T} \{I'_{(x',y')}(i, j) - \bar{I}'\}^2}}$$

where $$\bar{I} = \frac{1}{M_T N_T} \sum_{i=-M_T}^{M_T} \sum_{j=-N_T}^{N_T} I_{(x,y)}(i, j),$$

$$\bar{I}' = \frac{1}{M_T N_T} \sum_{i=-M_T}^{M_T} \sum_{j=-N_T}^{N_T} I'_{(x',y')}(i, j),$$

and (x, y) and (x', y') represent the positions of the templates in the reference image I and the search image I', respectively. $I_{(x,y)}(i, j)$ and $I'_{(x',y')}(i, j)$ represent partial images.

After the calculation of the similarity in all of the search areas, the position with the highest similarity is regarded as the corresponding position to calculate the motion vectors. If no occlusion is present, as many motion vectors are calculated as the number of the attention points 404 set on the reference image (left image 401). Each of the motion vectors is represented as follows by a vector starting from the position of the attention point 404 in the reference image and ending at the position of the corresponding point in the search image (right image 402):

$$(x, y, x', y')^i, i=1, \ldots, m$$

(m represents the number of the motion vectors)

The example of the block matching in which the attention points are fixedly arranged in the grid pattern has been shown. Alternatively, it is possible to extract a feature point with which a motion vector is readily calculated on the reference image and to define the position of the feature point as the attention point.

The extraction of the attention point is typically performed by using an image processing filter such as Harris operator (C. Harris and M. Stephens, "A combined corner and edge detector", Fourth Alvey Vision Conference, pp. 147-151, 1988).

The Harris operator first determines the size of a window W and calculates differential images ($I_{dx}$, $I_{dy}$) in horizontal and vertical directions. The calculation may be performed with a Sobl filter for calculation of the differential images. For example, by using a filter defined as h=[1, √2, 1]/[2+√2], ($I_{dx}$, $I_{dy}$) is provided by applying 3×3 filter $h_x$ arranged in a vertical direction and 3×3 filter $h_y$ arranged in a horizontal direction to the image.

For all of coordinates (x, y) in the images, the following matrix G is calculated using the window W:

$$G = \begin{bmatrix} \sum_W I_x^2 & \sum_W I_x I_x \\ \sum_W I_x I_x & \sum_W I_y^2 \end{bmatrix}.$$

In addition, feature points are extracted in order from coordinates (x, y) having a larger minimum singular value of the matrix G. In this case, it is preferable to prevent dense distribution of the singular points. Thus, it is possible to make a rule not to extract a feature point in an area close to the window W including the coordinates (x, y) at which a feature point is already extracted.

S302 is the shake-correction parameter calculating step. At this step, the motion vectors between the current frame and the past frame are received as input, and the shake correction parameter for the target frame is output. When no delay is produced in the calculation, the shake correction parameter is for the current frame as the target frame. When delay is produced, a frame of calculation target of the shake correction parameter is a frame which is older corresponding to the delay amount.

Figure 5:
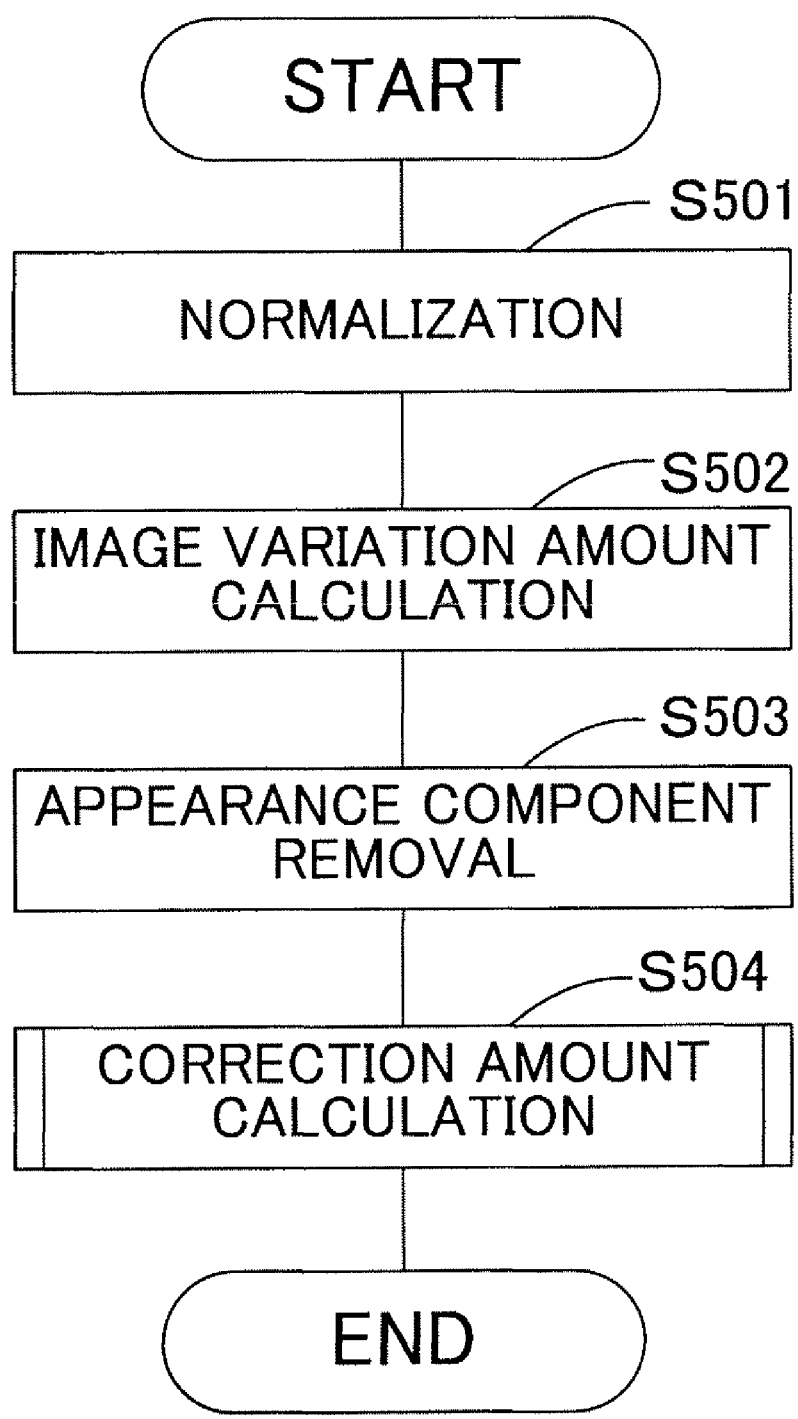
FIG. 5 is a flow chart showing a shake correction parameter calculating procedure in Embodiment 1.

At the shake-correction parameter calculating step S302, the shake correction parameter is calculated at subdivided steps as shown in FIG. 5. The shake correction parameter is formed of a geometric transforming matrix which represents the in-camera parameters, the distortion coefficient, and the shake correction amount.

First, at a normalization step of S501, the values of the motion vectors in a pixel coordinate system of the input frame are transformed into the values of motion vectors in a normalized image coordinate system. Coordinates (x, y) represent the pixel coordinates on the input frame, coordinates ($u_0$, $v_0$) represent the normalized image coordinates including distortion, and coordinates (u, v) represent the normalized image coordinates where the distortion was excluded. In this case, the motion vectors are first transformed into the normalized image coordinates with the in-camera parameters. In the following expression, inv( ) represents an inverse matrix of the matrix in the parentheses:

$$\begin{bmatrix} u_d \\ v_d \\ 1 \end{bmatrix} = \mathrm{inv}\left(\begin{bmatrix} f_{c\_new}k_u & 0 & u_0 \\ 0 & f_{c\_new}k_v & v_0 \\ 0 & 0 & 1 \end{bmatrix}\right)\begin{bmatrix} x \\ y \\ 1 \end{bmatrix}.$$

Then, the distortion is removed with the distortion coefficient as follows:

$$\begin{bmatrix} u_d \\ v_d \end{bmatrix} \rightarrow \begin{bmatrix} u \\ v \end{bmatrix}.$$

The calculation represented by "→" is performed by the following processing:

The distortion removal is performed by using the following expressions which represent the relationship of radial distortion:

$$K = 1 + k_1 r + k_2 r^2 + k_3 r^3 + \ldots, \quad r^2 = u_d^2 + v_d^2$$

$$u = u_d/K, \quad v = v_d/K$$

where $k_1$, $k_2$, and $k_3$ represent distortion coefficients in first, second, and third order radial directions, respectively. These distortions are caused by the aberration of the lens optical system 101.

The distortion varies with the focal length of the lens optical system 101. Thus, the relationship between the distortion and the focal length is previously provided through calculation from designed values or measurement with variation of the focal length. The relationship is stored on the non-volatile memory part 112 as the lookup table associated with the focal length or the transformation expression relating to the focal length.

The system controlling part 110 calculates the focal length based on the zoom state of the lens optical system 110 sent from the zoom adjusting part 111, obtains the corresponding distortion coefficient from the calculation with the calculation expression or with reference to the lookup table, and provides the obtained distortion coefficient to each processing part.

Only the distortion in the radial directions is removed in Embodiment 1. If another distortion is serious such as distortion in a moving radius direction, additional distortion removal processing may be performed.

At an image variation amount calculating step of S502, the motion vectors between the frames transformed into the normalized image coordinate system are used as input to calculate the image variation amount between the frames. The projective homography is used as the index of the image variation amount. The following linear expression for the projective homography can be provided by setting the normalized image coordinates in the past frame to $(u_i, v_i)$, the normalized image coordinates in the current frame to $(u_i', v_i')$, and $i = 1, \Lambda, m$ (m represents the number of the motion vectors):

$$\begin{bmatrix} 0 & 0 & 0 & -u_i & -v_i & -1 & v_i'u_i & v_i'v_i & v_i' \\ u_i & v_i & 1 & 0 & 0 & 0 & -u_i'u_i & -u_i'v_i & -u_i' \\ \vdots & \vdots & \vdots & \vdots & \vdots & \vdots & \vdots & \vdots & \vdots \\ 0 & 0 & 0 & -u_m & -v_m & -1 & v_m'u_m & v_m'v_m & v_m' \\ u_m & v_m & 1 & 0 & 0 & 0 & -u_m'u_m & -u_m'v_m & -u_m' \end{bmatrix}\begin{bmatrix} h_{11} \\ h_{12} \\ h_{13} \\ h_{21} \\ h_{22} \\ h_{23} \\ h_{31} \\ h_{32} \\ h_{33} \end{bmatrix} = 0.$$

The linear expression is overdetermined if the number m of the corresponding points is equal to or larger than eight. The expression can be solved as a linear least square expression to provide the following:

$$h = \{h_{11}, \ldots, h_{33}\}.$$

This is shaped into a matrix of 3×3 to provide the projective homography represented as follows, that is, the image variation amount:

$$H = \begin{bmatrix} h_{11} & h_{12} & h_{13} \\ h_{21} & h_{22} & h_{23} \\ h_{31} & h_{32} & h_{33} \end{bmatrix}.$$

At an appearance variation component removal step of S503, an appearance variation component is removed from the image variation amount determined between the frames. The image variation amount, that is, the projective homography is the index representing the motion between the frames and is formed of information on camera works including the rotation and translation (information on the rotation and translation) and information on scene arrangement including the depth position and direction of the reference plane in space.

The relationship between the projective homography and the camera works and scene arrangement is represented by the following expression:

$$H = \lambda\left(R + \frac{1}{d}\vec{n}\vec{t}^T\right)$$

where R represents the rotation of the camera, $\vec{t}$ the translation of the camera, d the distance to the reference plane, $\vec{n}$ the normal to the reference plane in the direction away from the camera, and λ an arbitrary constant.

In calculation from two images, the product of the distance d to a spatial plane and a norm of a translation camera work expressed as below cannot be resolved:

$$\mathrm{norm}(\vec{t}).$$

The norm refers to the amount representing the size of the vector. In this case, $\vec{t}$ is handled as $\mathrm{norm}(\vec{t}) = 1$ that is a unit direction vector representing the translation direction. d is handled as the product of the distance to the spatial plane and the translation amount.

The appearance variation component is defined as a difference between a projective homography for a reference plane oriented in an arbitrary direction and a projective homography for a reference plane oriented perpendicularly to the optical axis.

Specifically, an image variation amount is produced by translation with respect to the reference plane oriented in the arbitrary direction, and an image variation amount is calculated which is produced by translation of the same amount with respect to the reference plane present at the same depth position and perpendicular to the optical axis. The difference between them is defined as the appearance change amount.

In other words, the appearance variation component shows shear in geometric transformation between images. The component corresponds to a component which distorts an image when image stabilization is performed by using the inversely transformed image variation amount as the correction amount. The appearance variation component should be removed in determining motion information appropriate for image stabilization.

From a different viewpoint, the removal of the appearance variation component corresponds to the turning of the direction of the reference plane of the homography arbitrarily determined on the basis of the distribution of the corresponding points in space to a direction in parallel with the image plane before the displacement due to the motion. It corresponds to the turning of the direction of the normal to the reference plane to a direction in parallel with the optical axis of the image plane before the displacement.

To remove the appearance variation component, the projective homography is decomposed into camera work rotation R, a direction $\vec{n}$ of a plane approximate to an object in a scene, and a product of translation $\vec{t}$ and the reciprocal of depth d as follows:

$$\vec{t}/d.$$

Then, the plane direction $\vec{n}$ is replaced with the direction perpendicular to the camera optical axis, thereby calculating the homography in which the appearance variation component is excluded.

First, in resolution of the projective homography, two possible solutions are calculated with the following procedure. The decomposition of the projective homography into the two solutions is performed by using eigenvalue resolution or singular value resolution to find an invariant. Although various manners of solution may be used, the following description will be made with reference to the approach used in B, Triggs, "Autocalibration from Planar Scene" ECCV98.

First, assuming that the sign of H is selected to satisfy $\vec{x}_2^T H \vec{x}_1 > 0$ at all of the corresponding points $\vec{x}_1$, $\vec{x}_2$ on a plane.

The singular value resolution of H is given as $H = USV^T$, where U and V represent 3×3 rotation matrixes.

Further, $s = \text{diag}(\sigma_1, \sigma_2, \sigma_3)$ represents a positive descending diagonal element ($\sigma 1 \geq \sigma 2 \geq \sigma 3 \geq 0$) and is set to the singular value of H Column elements of U and V that are associated orthogonal matrixes are represented as u1, u2, u3 and v1, v2, v3.

The reference system of a first camera is employed and a three-dimensional plane is represented by:

$$\vec{n}^T \vec{x} = d = 1/\zeta;$$

where $\vec{n}$ represents the outward normal (direction away from the camera), and $\zeta (=1/d \geq 0)$ represents the reciprocal of the distance to the plane. In the reference system, the first camera has a 3×4 projection matrix $P1 = [I3 \times 3 | \vec{0}]$.

In a second camera, $P2 = R[I3 \times 3 | t] = [R|t']$, where $t' = -Rt$, and t and t' represent translation between the cameras (translation from the optical axis center of the first camera to the optical axis center of the second camera), and R represents rotation between the cameras.

The homography representing the image variation from an image 1 of the first camera to an image 2 of the second camera is $H = RH_1$, and $H_1 = I_{3 \times 3} - \zeta \vec{t} \vec{n}^T$ holds. For a three-dimensional point $\vec{x}$ on the plane, $H\vec{x} = R(\vec{x} - \zeta \vec{t} \vec{n}^T \vec{x}) = R(\vec{x} - \vec{t}) \approx P_2 \vec{x}$ holds because $\zeta \vec{n}^T \vec{x} = 1$ is given. When $\vec{x}$ is handled as an arbitrary point in the image 1, the difference is only the whole scale factor.

Only the product $\zeta \vec{t} \vec{n}^T$ is restorable, so that normalization is performed with $\|t\| = \|n\| = 1$, that is, the plane distance $1/\zeta$ is measured in a unit base length $\|t\|$. A depth positive constraint test, later described, is performed to determine the possible sign.

$H = USV^T$ and $H_1 = U_1 SV^T$ in the singular value resolution are identical for the element of R, that is, $U = RU_1$. In $H_1$, the outer vector $\vec{t} \times \vec{n}$ invariant. If the singular value is obvious, $\vec{t} \times \vec{n}$ should correspond to a singular vector. It is apparent that this is always the second singular vector v2. Thus, correction normalization of H is performed as $H \to H/\sigma 2$, that is, $(\sigma 1, \sigma 2, \sigma 3) \to (\sigma 1/\sigma 2, 1, \sigma 3/\sigma 2,)$. In the following, it is assumed that normalization with $\sigma 2$ is already performed.

In the image frame 1, it is given that $\vec{t} \times \vec{n}$ corresponds to v2, a partial space $\{\vec{t}, \vec{n}\}$ should be occupied by $\{v1, V3\}$. That is, $\vec{n} = \beta \vec{v}_1 - \alpha \vec{v}_3$ and $\vec{n} \times (\vec{t} \times \vec{n}) \approx \alpha \vec{v}_1 + \beta \vec{v}_3$ hold for arbitrary parameters $\alpha$, $\beta$ (where $\alpha 2 + \beta 2 = 1$). An arbitrary direction (especially $\vec{n} \times (\vec{t} \times \vec{n})$) orthogonal to $\vec{n}$ has a norm which is invariant with $H_1$.

In this case, $(\alpha \sigma_1)^2 + (\beta \sigma_3)^2 = \alpha^2 + \beta^2$ or $(\alpha, \beta) = (\pm \sqrt{1 - \sigma_3^2}, \pm \sqrt{\sigma_1^2 - 1})$ holds.

If $\vec{t} \times \vec{n}$ corresponds to the abovementioned v1 or v3, no solution is found. Thus, it can correspond to only v2.

Strictly, the same argument on the left-hand side shows $R\vec{t} = -(\beta u_1 + \alpha u_3)$. If satisfies an eigenvector $1 - \zeta \vec{n}^T \vec{t}^T$ which is an eigenvalue of $H_1$, $H\vec{t} = (1 - \zeta \vec{n}^T \vec{t})R\vec{t}$ is given. Thus, $t \approx H^{-1}(R\vec{t}) \approx I/\sigma_1 \vec{v}_1 + \alpha/\sigma_3 \vec{v}_3$ holds. After simplification, $\zeta = \sigma 1 - \sigma 3$ holds.

The columns $(\vec{u}_1, \vec{u}_2, \vec{u}_3)$ of $U_1$ that is the left-hand side of the singular value resolution of $H_1$ is restorable with the notation of $\vec{u}_2 = \vec{v}_2$, and $\vec{t}$ needs to be an eigenvector of $H_1$.

In this case, $\vec{u}_1 = \gamma \vec{v}_1 + \delta \vec{v}_3$ and $\vec{u}_3 = \delta \vec{v}_1 - \gamma \vec{v}_3$ hold. After simplification, $(\gamma, \delta) \approx (1 + \sigma_1 \sigma_3, \pm \alpha \beta)$ holds. Thus, $$R = U U_1^T = U \begin{bmatrix} \gamma & 0 & \delta \\ 0 & 1 & 0 \\ -\delta & 0 & \gamma \end{bmatrix} V^T$$

is assumed and finally the rotation R is obtained.

Next, a series of specific processing is shown for calculating the two possible solutions for resolving the image variation amount into the camera work R including the rotation and translation, and the scene arrangement including $\vec{t}$ (direction vector), the depth position d and direction $\vec{n}$ of the reference plane in space.

$$[U, S, V] = svd(H)$$

$$\sigma'_1 = \sigma_1/\sigma_2, \sigma'_3 = \sigma_3/\sigma_2$$

where $$S = \begin{bmatrix} 0 & 0 & 0 \\ 0 & \sigma_2 & 0 \\ 0 & 0 & \sigma_3 \end{bmatrix}, \sigma_1 \geq \sigma_2 \geq \sigma_3 \geq 0$$

$$\zeta = (1/d) = \sigma'_1 - \sigma'_3$$

$$a_1 = \sqrt{1 - \sigma'^2_3}, \, b_1 = \sqrt{\sigma'^2_1 - 1}$$

$$a = a_1 / \sqrt{a_1^2 + b_1^2}, \, b = b_1 / \sqrt{a_1^2 + b_1^2}$$

$$c = (1 + \sigma'_1\sigma'_3) / \sqrt{(1 + \sigma'_1\sigma'_3)^2 + (a_1 b_1)^2}$$

$$d = (a_1 b_1) / \sqrt{(1 + \sigma'_1\sigma'_3)^2 + (a_1 b_1)^2}$$

$$e = (-b/\sigma'_1) / \sqrt{(-b/\sigma'_1)^2 + (-a/\sigma'_3)^2}$$

$$f = (-a/\sigma'_3) / \sqrt{(-b/\sigma'_1)^2 + (-a/\sigma'_3)^2}$$

$$\vec{v}_1 = V(:,1), \quad \vec{v}_3 = V(:,3)$$

$$\vec{u}_1 = U(:,1), \quad \vec{u}_3 = U(:,3).$$

The above can be used to determine the two possible solutions expressed by:

$$\{R_1, \vec{t}_1, \vec{n}_1\}, \{R_2, \vec{t}_2, \vec{n}_2\}$$

where $\vec{n}_1 = b\vec{v}_1 - a\vec{v}_3$, $\vec{n}_2 = b\vec{v}_1 + a\vec{v}_3$ $$R_1 = U \begin{bmatrix} c & 0 & d \\ 0 & 1 & 0 \\ -d & 0 & c \end{bmatrix} V^T, \quad R_2 = U \begin{bmatrix} c & 0 & -d \\ 0 & 1 & 0 \\ d & 0 & c \end{bmatrix} V^T$$

$\vec{t}_1 = -(b\vec{u}_1 + a\vec{u}_3)$, $\vec{t}_2 = -(b\vec{u}_1 - a\vec{u}_3)$ (corresponding to $P_2 = [R|t]$)

A promise (depth positive constraint) that the direction vector $\vec{n}$ is outward is introduced to the two possible solutions.

The two possible solutions are calculated by achieving consistency with the sign of if($\vec{n}_1(3)<0$) $\vec{t}_1 = -\vec{t}_1, \vec{n}_1 = -\vec{n}_1$ and if($\vec{n}_2(3)<0$) $\vec{t}_2 = -\vec{t}_2, \vec{n}_2 = -\vec{n}_2$. Then, Epipolar error check is performed to extract one solution with less error.

The Epipolar error check is performed as follows. For a set of two solutions $\{R_1 \vec{t}_1/d, \vec{n}_1\} \ldots \{R_2, \vec{t}_2/d, \vec{n}_2\}$. for attitude change and scene information obtained by resolving the homography calculated using the corresponding points $\vec{x}_1$, $\vec{x}_2$, Epipolar errors are calculated using the corresponding points.

The Epipolar error is represented by:

$$e_i = \sum_j^n \left( \vec{x}_2^{jT} \left( [\vec{t}_i]_\times R_i \right) \vec{x}_1^j \right), i = 1, 2, \, j = 1, 2, \ldots, n$$

where n represents the number of the corresponding points. The solution with less error is selected as a true solution. Then, the only one solution of $\{R, \vec{t}, \vec{n}\}$ is determined.

The reference plane normal $\vec{n}$ in $\{R, \vec{t}/d, \vec{n}\}$ obtained by resolving the image variation amount is replaced with $\vec{e}_3[0,0,1]^T$ representing the normal perpendicular to the optical axis to recalculate the image variation amount as follows:

$$H = R + \frac{1}{d}\vec{e}_3 \vec{t}^T.$$

In this manner, the image variation amount in which the appearance variation amount is excluded is calculated.

The recalculation of the image variation amount in which the appearance variation component is excluded may be performed by using the rotation R provided from the resolution of the image variation amount and the corresponding points $\vec{x}_1$, $\vec{x}_2$ in the normalized image coordinate system, not by changing the reference plane normal $\vec{n}$.

First, $\vec{x}_2' = R^T \vec{x}_2$ is calculated. Then, calculation is performed in a least-square manner as follows to determine scaling and translation (vertical and horizontal) components which represent the influence of translation produced when the reference plane is perpendicular to the optical axis of the first camera upon the image variation amount between the corresponding points $\vec{x}_1$, $\vec{x}_2$ in which the influence of the rotation R of the camera work was excluded:

$$[s, t_x, t_y] = est(\vec{x}_1, \vec{x}_2')$$

where est( ) represents processing for calculating the displacement components of scaling and translation (vertical and horizontal) between the corresponding points in the parentheses in the least-square manner.

Then, $$H = \begin{bmatrix} 1 & 0 & t_x \\ 0 & 1 & t_y \\ 0 & 0 & 1 \end{bmatrix} \begin{bmatrix} s & 0 & 0 \\ 0 & s & 0 \\ 0 & 0 & 1 \end{bmatrix} \cdot R$$

is calculated. As a result, it is thus possible to stably determine in another approach the contribution of the translation camera work to the homography obtained by providing a plane. This allows calculation of the image variation amount in which the appearance variation component was excluded, similarly to the case where the reference plane normal $\vec{n}$ is changed.

At a correction amount calculating step of S504, the image variation amount between the frames in which the appearance variation amount was excluded is used as input. The shake correction amount is calculated for a certain target frame by using a series including the series represented by $H^{n-k+1}$, $H^{n-k+2}, \ldots, H^n$ which is calculated between the past frames for the variation amount, where n represents the current frame number and k represents the number of constituent frames included in the series.

Next, shake correction is performed such that a motion component at high frequency is regarded as a component to be subjected to image stabilization and is removed from a video sequence. A motion component at low frequency is regarded as an intended motion component and is saved in the video.

Specifically, these signal components are separated through filtering. The filtering is realized by digital filtering. The number of the constituent frames of the input series corresponds to the number of taps of the digital filter.

Figure 7:
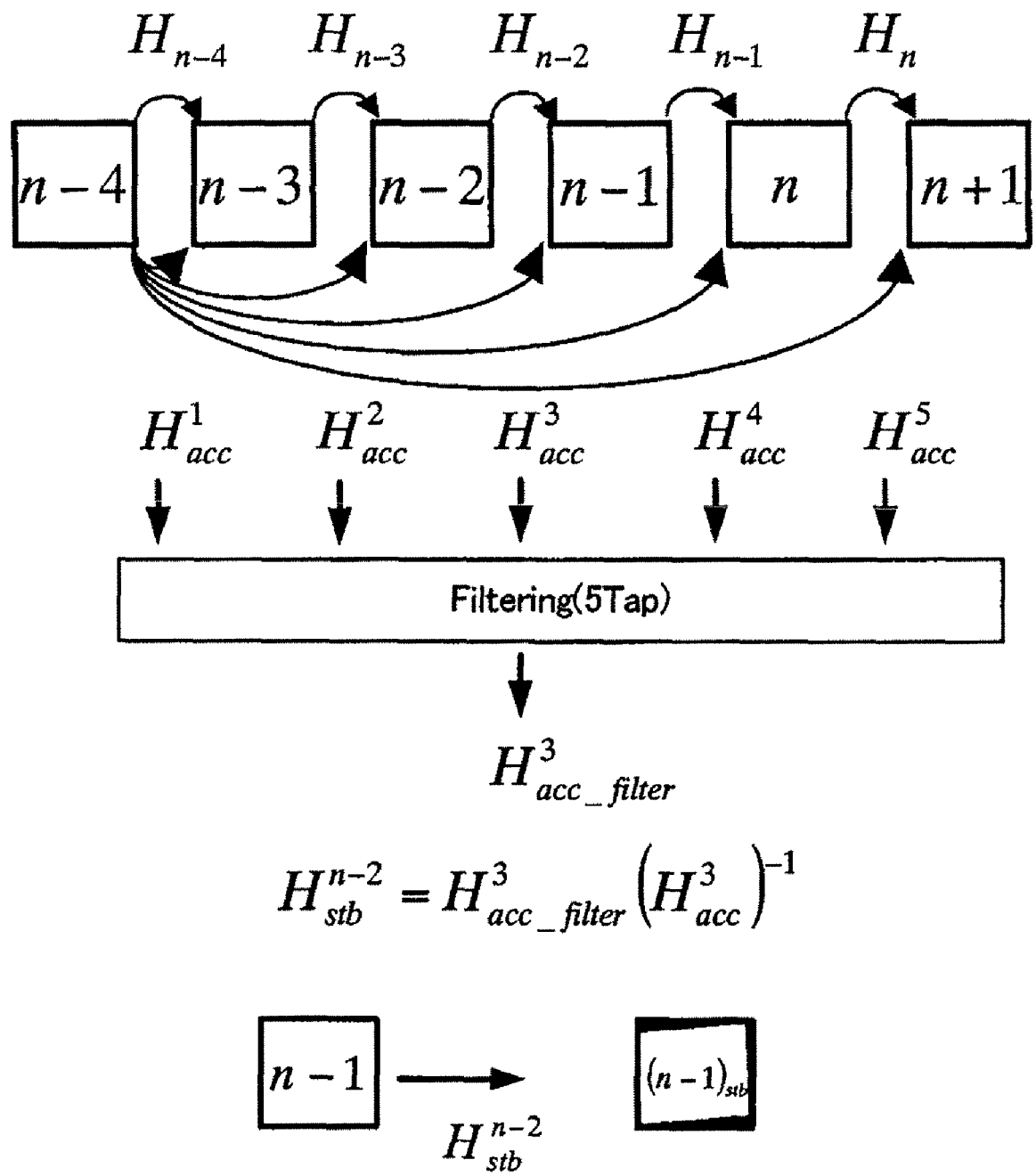
FIG. 7 is a schematic diagram showing a digital filtering procedure in the correction amount calculating procedure in Embodiment 1.

FIG. 7 is a schematic diagram for explaining the processing of calculation of the shake correction amount through the digital filtering. The digital filter is an FIR filter having five taps, by way of example. Calculation of the shake correction amount for one frame requires image variation amounts among five frames.

Figure 18:
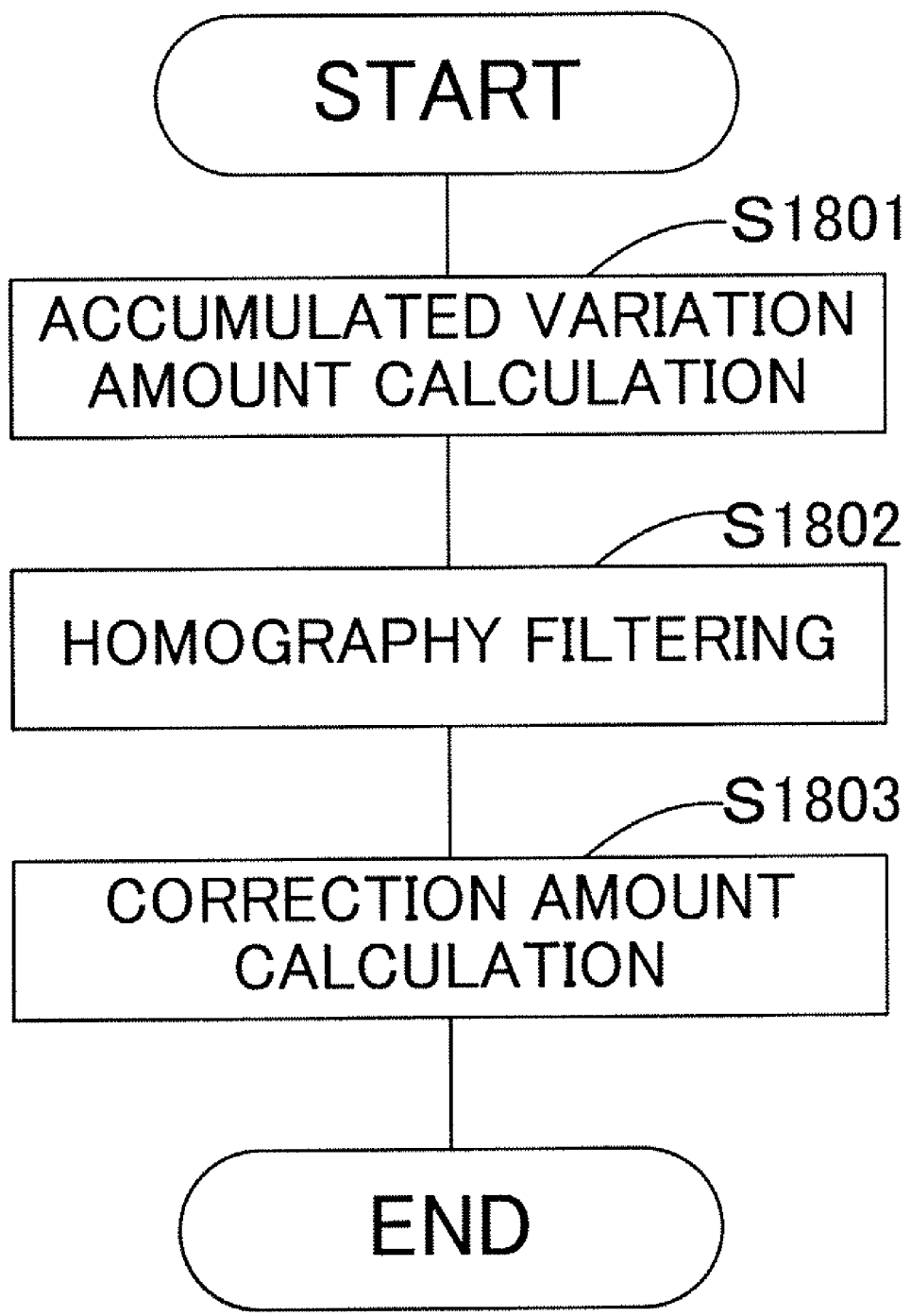
FIG. 18 is a flow chart showing a digital filtering procedure in the shake correction parameter calculating procedure in Embodiment 1.

FIG. 18 shows the procedure of the correction amount calculation.

First, at an accumulated variation amount calculating step of S1801, accumulated variation amounts represented by $H_{acc}^{1}, H_{acc}^{2}, \ldots, H_{acc}^{5}$ that are based on the top of the input series are calculated from the image variation amounts calculated between the current frame and the past frame and between the past frames at different points of time (for example, the image variation amount between the current frame and a first past frame, the image variation amount between the first past frame and a second past frame, and the image variation amount between the second past frame and a third past frame), where $$H_{acc}^{i}=H^{n-k+i}\ldots H^{n-k+2}H^{n-k+1}(i \leq k).$$

Thus, an example in this case is given as follows:

$$H_{acc}^{3}=H^{n-2}H^{n-3}H^{n-4}.$$

At a homography filtering step of S1802, filtering is performed on the series of the accumulated variation amount homography. To design the digital filter and determine the coefficient thereof, a Fourier series method and a window function method are used in combination. Characteristics including a transition area and the number of taps are determined to calculate the coefficient of the digital filter.

The accumulated variation amount series $H_{acc}^{1}$, $H_{acc}^{2}, \ldots, H_{acc}^{5}$ according to the number of taps of the digital filter (TAP=5) is input and the digital filtering is performed. As a result, the filtering result $H_{acc\_filter}^{3}$ influenced by the delay is output. When the digital filter is formed of the FIR filter, the delay amount is proportional to the number of taps.

Specifically, the delay amount is represented by (TAP)/2.

Accordingly, for the digital filter including five taps, the delay for two frames is produced. Therefore, when the image variation amount ($H^{n-4}\ldots, H^{n}$) from the current frame to the frame four frames before the current frame is used to calculate the accumulated variation amount ($H_{acc}^{1}, H_{acc}^{2}, \ldots, H_{acc}^{5}$) to perform the digital filtering, the result of the filtering corresponds to an accumulated variation amount $H_{acc}^{3}$ for the frame two frames before the current frame.

At a correction amount calculating step of S1803, the shake correction amount is calculated by using the image variation amount $H_{acc\_filter}^{i}$ restored from the filtering result and the accumulated variation amount $H_{acc}^{i}$ of the image variation amount to the target frame, the accumulated variation amount corresponding to the target frame as a result of the delay.

When the digital filter is formed of a low-pass filter, $H_{stb}^{n-(k-1)/2}=H_{acc\_filter}^{k-(k-1)/2}H_{acc}^{k-(k-1)/2}$ is calculated to determine the shake correction amount for the target frame, where k represents the number of taps of the digital filter. In this example with five taps, $H_{stb}^{n-2}=H_{acc\_filter}^{3}(H_{acc}^{3})^{-1}$ is used to calculate the shake correction amount for the frame two frames before the current frame. In this example, if an n+1 frame is set as the current frame, an n−1 frame is subjected to image-stabilization processing.

With the abovementioned procedure, the shake correction amount is calculated for the corresponding frame. However, the digital filtering is typically based on the premise that the input signal is a one-dimensional signal having only the time axis.

Therefore, it is necessary to perform transformation (component resolution) of the homography series which is the multi-dimensional amount into a plurality of one-dimensional amount series, for example, sets of series $a_1^{1}, a_1^{2}, \ldots, a_1^{i}$ and $a_2^{1}, a_2^{2}, \ldots, a_2^{i}$ before the filtering step.

In Embodiment 1, the projective homography $$H_{acc}^{i} = \begin{bmatrix} h_1 & h_2 & h_3 \\ h_4 & h_5 & h_6 \\ h_7 & h_8 & h_9 \end{bmatrix} (i=1,\ldots,k)$$

which is the image variation amount between the frames is transformed into a set of one-dimensional amount series including resolved components similar to the camera works. Then, the digital filtering is performed. Thereafter, the set of one-dimensional amount series after the filtering is inversely transformed to provide the projective homography after the filtering represented as follows:

$$H_{acc\_filter}^{k-(k-1)/2} = \begin{bmatrix} h'_1 & h'_2 & h'_3 \\ h'_4 & h'_5 & h'_6 \\ h'_7 & h'_8 & h'_9 \end{bmatrix}.$$

Figure 8:
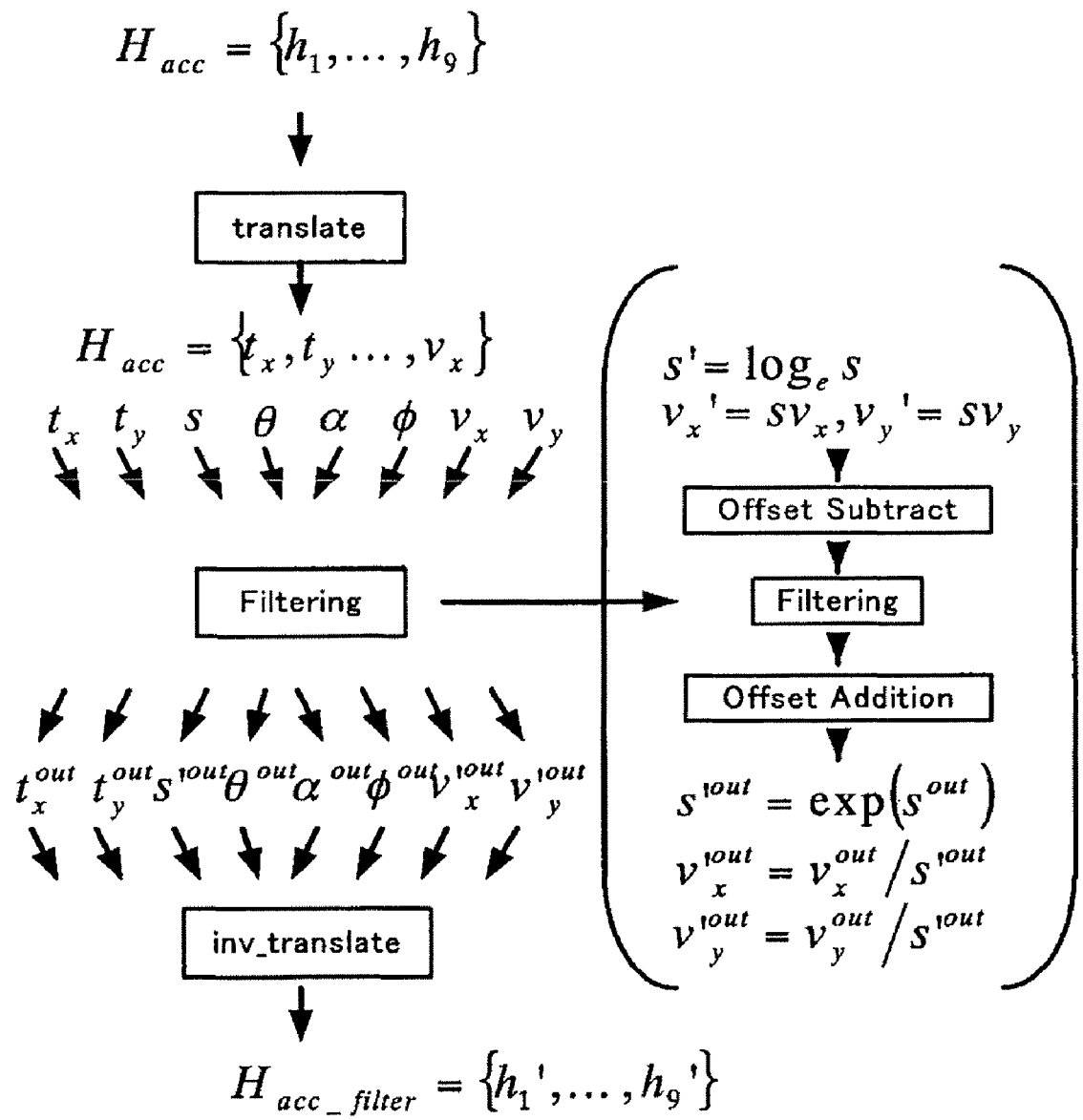
FIG. 8 is a schematic diagram showing a procedure for handling a projective homography which is a multi-dimensional amount in the digital filtering of Embodiment 1.

FIG. 8 is a schematic diagram for explaining the internal processing of the filtering processing of FIG. 7 and the homography filtering step S1802 in the processing procedure of FIG. 18 in more detail.

Figure 19:
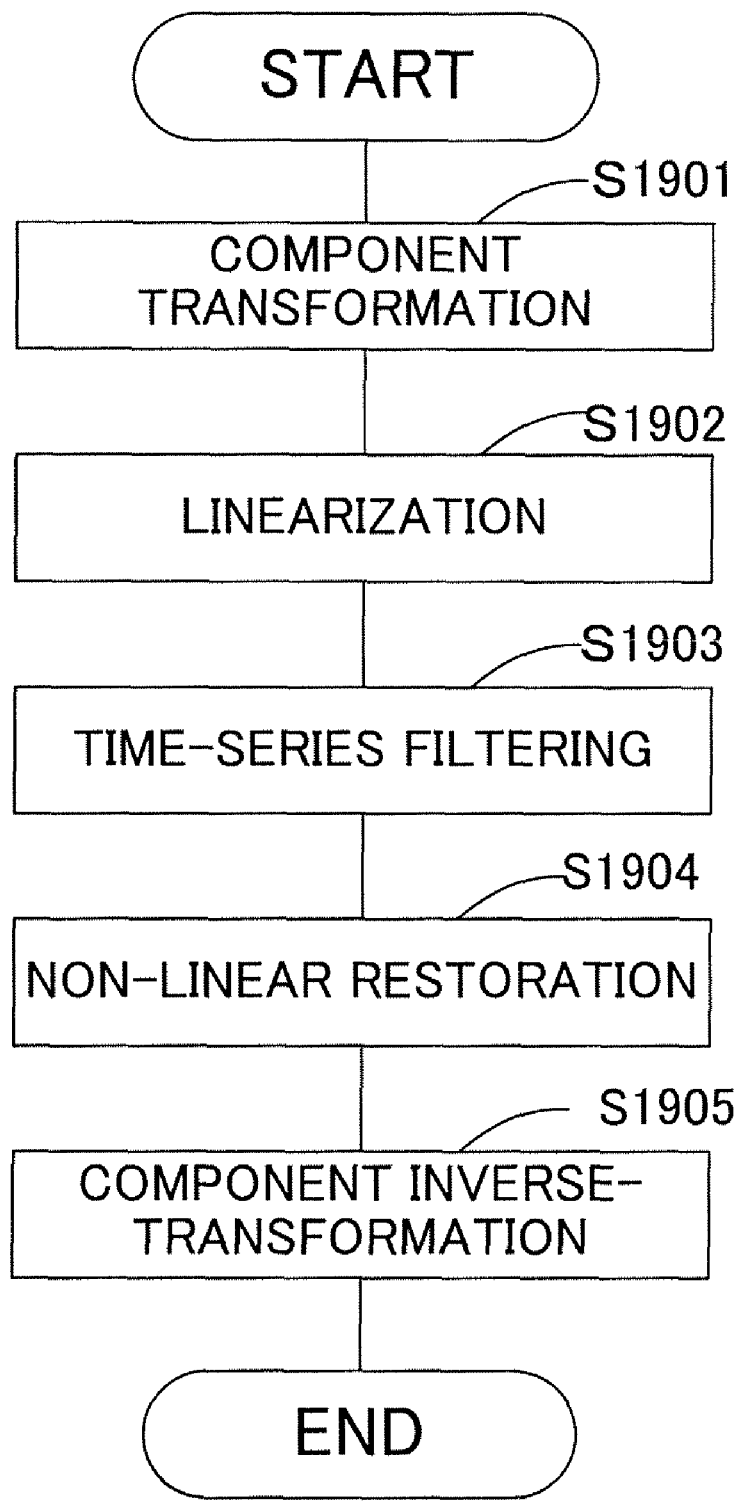
FIG. 19 is a flow chart showing the digital filtering procedure in Embodiment 1 in detail.

The projective homography represented as the multi-dimensional amount is transformed into a one-dimensional amount series. The one-dimensional amount series (time series) is then subjected to digital filtering. Thereafter, restoration of the filtering result of the one-dimensional amount series is performed to provide the filtered homography which is a multi-dimensional amount. The processing procedure is shown in FIG. 19.

At a component transforming step of S1901, first, each component of $H_{acc}^{i}$ is divided by $h_9$ to perform normalization such that $h_9=1$ holds for each accumulated variation amount homography represented by $H_{acc}^{i}=\{h_1, \ldots, h_9\}$. Then, the homography is resolved into seven components including translation (horizontal and vertical), scaling, rotation, shear, foreshortening (horizontal and vertical) which are motions in the image with the following expression.

$$H = H_S H_A H_P = \begin{bmatrix} sR & \vec{t} \\ \vec{0}^T & 1 \end{bmatrix} \begin{bmatrix} K & \vec{0} \\ \vec{0}^T & 1 \end{bmatrix} \begin{bmatrix} I & \vec{0} \\ \vec{v}^T & 1 \end{bmatrix} = \begin{bmatrix} A & \vec{t} \\ \vec{v}^T & 1 \end{bmatrix}$$

where $A=RK+\vec{t}\vec{v}^T$.

Then, $RK=A-\vec{t}\vec{v}^T$ is calculated, and R and K are resolved by qr resolution using the property of K that is an upper triangular matrix.

This achieves the resolution into eight parameters including horizontal translation tx, vertical translation ty, scaling s, rotation (in-plane rotation) θ, anisotropic magnification α of shear, direction angle φ of shear, horizontal foreshortening vx, and vertical foreshortening $\vec{t}, \vec{v}$, R and K are expressed as follows:

$$\vec{t} = [t_x, t_y]^T$$

-continued $$\vec{v} = [v_x, v_y]^T$$

$$R = \begin{bmatrix} \cos\theta & -\sin\theta \\ \sin\theta & \cos\theta \end{bmatrix}$$

$$K = \begin{bmatrix} \alpha & \tan\phi \\ 0 & 1 \end{bmatrix}.$$

The accumulated variation amount series $H_{acc}^1$, $H_{acc}^2$, ..., $H_{acc}^k$ is resolved into components similar to the camera works to provide a set of one-dimensional time-series amounts represented by:

$$[t_x, t_y, s, \theta, \alpha, \phi, v_x, v_y]^i (i=1, \ldots, k),$$

which is then used as input to perform digital filtering for each component.

Since the appearance variation component has been excluded and therefore the shear component should be always $\alpha=1$ and $\phi=0$, the filtering may not be performed. In other words, $[t_x, t_y, s, \theta, v_x, v_y]^i$ ($i=1, \ldots, k$) may be used as a set of input time-series signals. The digital filtering is performed for each component.

The digital filtering processing for each component will hereinafter be described. The processing corresponds to the processing in the parentheses of FIG. 8. For tx component, by way of example, the digital filtering is applied to the one-dimensional time-series signal having terms corresponding to the number of taps of $[t_x^1, t_x^2, \ldots, t_x^k]$.

Since the time-series signal is regarded as being steady, offset $\bar{t}$ is subtracted. The offset $\bar{t}$ represents the average value of $[t_x^1, t_x^2, \ldots, t_x^k]$ that is the one-dimensional signal series. The digital filtering is applied to the time-series signal from which the offset has been subtracted.

At a linearization step of S1902, to linearize the variation of the scaling term (scaling component) s, logarithmic transformation is performed on the scaling term with s'=log_e s and then the digital filtering is applied.

For the foreshortening terms vx and vy, the resulting values include the influence of the scaling term due to the calculation order in the transformation into the components similar to the camera works. To remove the influence, the digital filtering is performed as appearance on the image. Thus, the foreshortening terms (components) vx and vy are multiplied by the scaling component s to be transformed to the appearance on the image (vx'=svx, vy'=svy), and then the filtering on the appearance on the image as the product is performed.

At a time-series filtering step of S1903, the filtering is performed on the dimensional signal series for each component.

At a non-linear restoration step of S1904, only the final time-series term (output value for the current signal) is first extracted from the time-series signal of the filtering result. Here, $[t_x, t_y, s, \theta, v_x, v_y]^{out}$ is used as the output set. Then, $[\bar{t}_x, \bar{t}_y, \bar{s}, \bar{\theta}, \bar{v}'_x, \bar{v}'_y]$ which represents each offset term subtracted before the filtering is added thereto for restoration. In addition, the scaling term and the foreshortening term are restored. Specifically, the calculation (exponential transformation) of $s'=e^s$, $v_x'=v_x/s'$ and $v_y'=v_y/s'$ are performed.

However, the filtering result $[t_x, t_y, s', \theta, \alpha, \phi, v'_x, v'_y]^{out}$ determined in this manner is affected by the delay, so that this is not the motion component between the final frames. For the FIR filter which has k taps, the delay of (k−1)/2 occurs. In other words, the result corresponds to the filtering result of motions between frames (k−1)/2 before the current frame.

At a component inverse-transformation step of S1905, the homography form is restored from the one-directional amount set of the filtering result $[t_x, t_y, s', \theta, \alpha, \phi, v'_x, v'_y]^{out}$ with the following expression:

$$H_{fil} = \begin{bmatrix} s'^{out} R' & \vec{t}' \\ \vec{0}^T & 1 \end{bmatrix} \begin{bmatrix} K' & \vec{0} \\ \vec{0}^T & 1 \end{bmatrix} \begin{bmatrix} I & \vec{0} \\ \vec{v}'^T & 1 \end{bmatrix}$$

where $\vec{t}'=[t_x^{out}, t_y^{out}]^T$, $\vec{v}'=[v_x'^{out}, v_y'^{out}]^T$, $$R = \begin{bmatrix} \cos\theta^{out} & -\sin\theta^{out} \\ \sin\theta^{out} & \cos\theta^{out} \end{bmatrix} \text{ and}$$

$$K = \begin{bmatrix} \alpha^{out} & \tan\phi^{out} \\ 0 & 1 \end{bmatrix}.$$

Then, as described above, the shake correction amount is calculated using the image variation amount restored from the filtering result $H_{acc\_filter}^i$ and the accumulated variation amount $H_{acc}^i$ of the image variation amount to the target frame, the accumulated variation amount corresponding to the target frame as a result of the delay.

S303 is a geometric transformation step. This step uses, as input, the shake correction parameters including the shake correction amount calculated in the shake-correction parameter calculating part 106, and the in-camera parameters and the distortion coefficient sent from the system controlling part 110. The target frame input from the work memory 105 is also used as input.

The geometric transformation processing part 107 applies the shake correction parameters on the target frame to perform geometric transformation, thereby providing a frame after the image stabilization processing. The geometric transformation is realized with backward mapping, for example.

The shake correction parameters include the in-camera parameters in image-pickup operation, the distortion coefficient, and the shake correction amount, as well as the in-camera parameters and distortion coefficient after the geometric transformation. Typically, the in-camera parameters after the geometric transformation are set to be equal to those before the geometric transformation except for the focal length. In contrast, the focal length is set to be longer than that before the geometric transformation in order to ensure redundant pixels for image stabilization, and the angle of view is determined so as not to produce a loss in video sequence. The video after the geometric transformation is typically output without any distortion.

The shake correction amount is represented by a 3×3 geometric transformation matrix for transforming image homogeneous coordinates in the normalized image coordinate system, for example.

Figure 6:
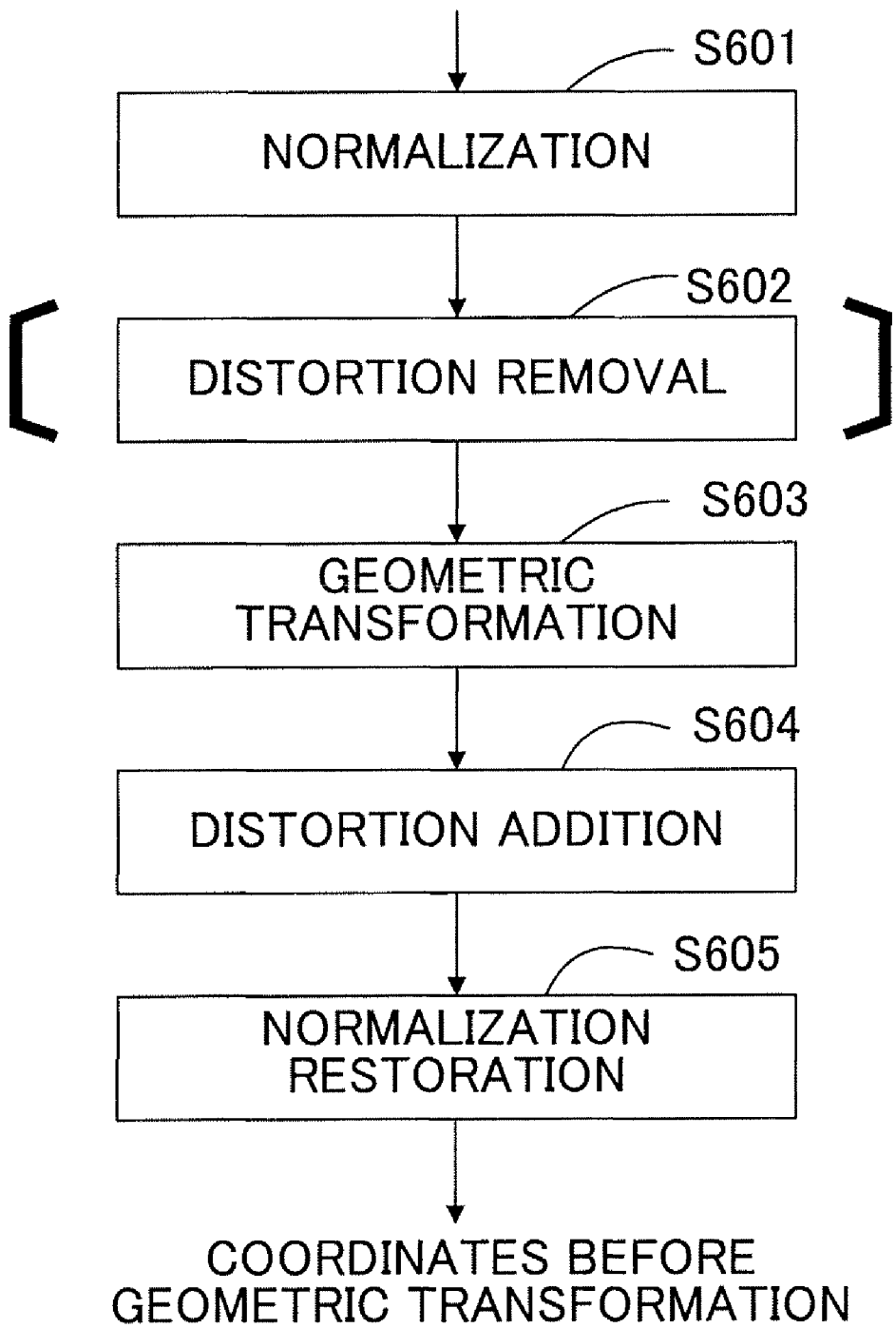
FIG. 6 is a flow chart showing a correction amount calculating procedure in Embodiment 1.

FIG. 6 shows a processing procedure for calculating the pixel coordinate position before the geometric transformation corresponding to the pixel coordinate position after the geometric transformation in the backward mapping. The pixel coordinate position before the geometric transformation corresponding to the pixel coordinate position after the geometric transformation is calculated, and the pixel value of the pixel coordinate position before the geometric transformation is calculated with interpolation. This procedure is performed for all of the pixel positions after the geometric transformation to provide the frames after image-stabilization processing.

At a normalization step of S601, the pixel coordinates (x',y') of the frame after the image stabilization processing are transformed into coordinate values in the normalized image coordinate system. In other words, the image coordinates are determined on the camera coordinate system of focal length f=1 in which the influence of the in-camera parameters is excluded. The in-camera parameters including the focal length $f_{c\_new}$ after the image stabilization processing are used to perform the transformation into the coordinate values in the normalized image coordinate system by the following expression:

$$\begin{bmatrix} u'_d \\ v'_d \\ 1 \end{bmatrix} = inv\left(\begin{bmatrix} f_{c\_new}k_u & 0 & u_0 \\ 0 & f_{c\_new}k_v & v_0 \\ 0 & 0 & 1 \end{bmatrix}\right)\begin{bmatrix} x'_i \\ y'_j \\ 1 \end{bmatrix}$$

where inv( ) represents the inverse matrix of the matrix in the parentheses.

A distortion removing step of S602 is provided for removing distortion added to the image after the geometric transformation. Generally, the image (video) after the geometric transformation includes no distortion, so that this step is omitted if the output video includes no distortion. Thus, $(u_d', v_d') \rightarrow (u',v')$ holds.

In contrast, if the output video includes distortion, non-distortion coordinates (u', v') on the normalized image coordinates are calculated from distortion coordinates (ud', vd'). Specifically, the non-distortion coordinates (u', v') are determined with the procedure represented by the following expressions:

$$r^2 = u_d'^2 + v_d'^2$$

$$K = 1 + k_1 r + k_2 r^2 + k_3 r^3 + \ldots$$

$$u' = u_d'/K, \quad v' = v_d'/K.$$

At a geometric transformation step of S603, the inverse transformation of shake correction is performed on the normalized image coordinates. If a geometric transformation matrix for representing the shake correction amount is a 3×3 matrix H, the inverse matrix inv(H) is applied to normalized coordinate points (u', v') for the backward matching. Specifically, the normalized image coordinates (u, v) before the shake correction are calculated by the following expression:

$$\begin{bmatrix} u_p \\ v_p \\ m \end{bmatrix} = inv(H)\begin{bmatrix} u' \\ v' \\ 1 \end{bmatrix}$$

where $u = u_p/m$ and $v = v_p/m$.

At a distortion adding step of S604, the distortion before the geometric transformation is added to the normalized image coordinate values. The following expression is used to add displacement from the distortion in the radial directions:

$$\begin{bmatrix} u_d \\ v_d \end{bmatrix} = (1 + k_1 r + k_2 r^2 + k_3 r^3 + \ldots)\begin{bmatrix} u \\ v \end{bmatrix}$$

where $r^2 = u^2 + v^2$, and k1, k2, and k3 represent radial distortion coefficients of first, second, and third orders, respectively.

S605 is a normalization restoration step. At this step, the in-camera parameters are applied to the normalized image coordinates (ud, vd) before the shake correction having the distortion by the following expression to provide pixel coordinates on the input frame:

$$\begin{bmatrix} x \\ y \\ 1 \end{bmatrix} = \begin{bmatrix} f_u k_u & f_u k_u \cot\phi & u_0 \\ 0 & f_v k_v \sin\phi & v_0 \\ 0 & 0 & 1 \end{bmatrix}\begin{bmatrix} u_d \\ v_d \\ 1 \end{bmatrix}.$$

The pixel values of the pixel coordinates are sampled with interpolation such as bi-cubic interpolation to provide pixel values of each pixel of the frame after the image-stabilization processing. The backward mapping is performed on all of the frames after the image-stabilization processing to complete the geometric transformation processing.

With the abovementioned processing steps, the image-stabilization processing is performed on each frame of the video signal. The video stream after the image-stabilization processing is encoded in a video format such as NTSC and MPEG4 in the encoding/coding part 108.

Finally, the encoded video stream is recoded on the recording medium in the recording part 113.

The processing in Embodiment 1 allows preservation of a motion due to an intended camera work included in video picked up by a video camera having an image-pickup optical system of a very short focal length and effective suppression of an image shake due to an unintended camera shake.

The abovementioned time-series filtering in Embodiment 1 is performed by using the digital filtering. However, another filtering method may be used to separate image variation amounts produced from an intended camera work and an unintended camera shake.

While Embodiment 1 has been described in conjunction with the image stabilizing apparatus mounted on the video camera, the present invention can be realized as an image stabilizing apparatus which functions alone without having an image-pickup optical system or an image-pickup element. For example, a computer program for realizing the abovementioned image-stabilization processing function is installed on a personal computer to allow the personal computer to be used as the image stabilizing apparatus. In this case, video information taken by a video camera is input through a cable, a wireless LAN or the like to the personal computer which performs the image-stabilization processing.

Embodiment 2

Figure 9:
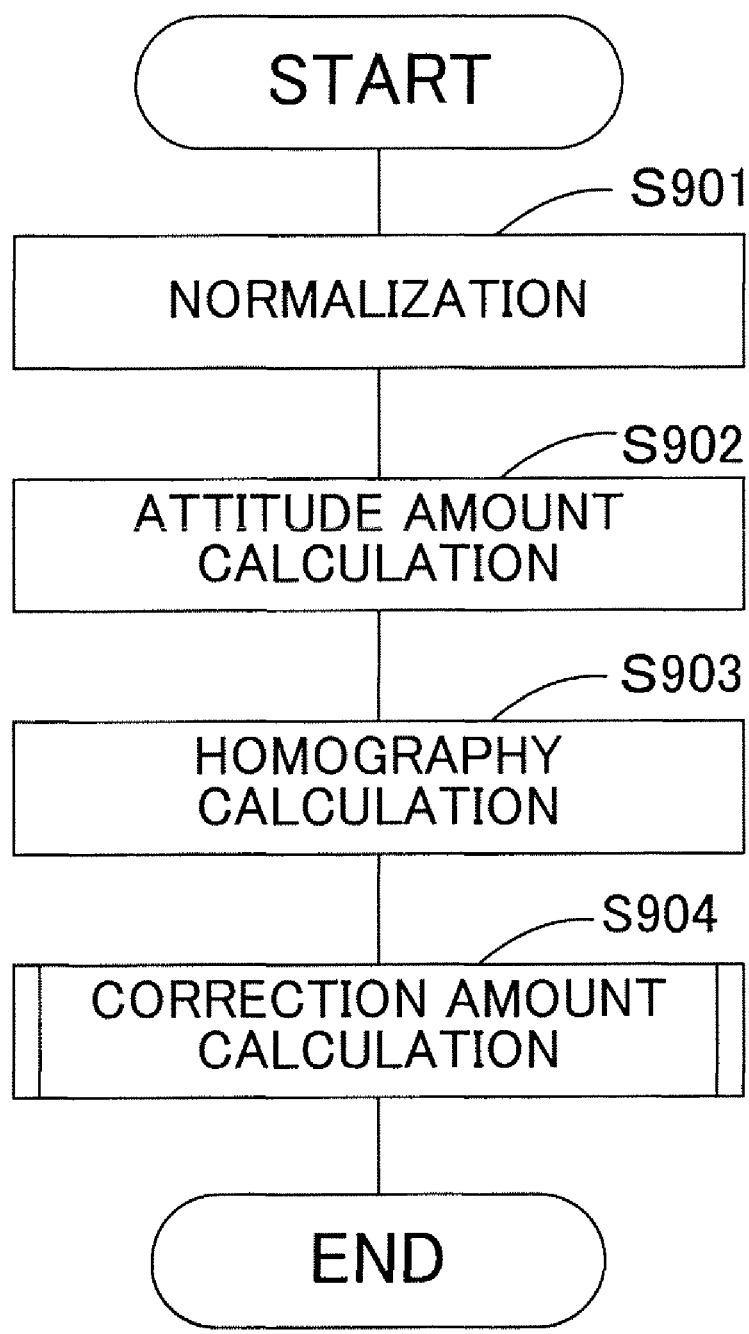
FIG. 9 is a flow chart showing a correction amount calculating procedure in Embodiment 2.

An image stabilizing apparatus which is Embodiment 2 and a video camera including the apparatus will hereinafter be described. The configurations of the image stabilizing apparatus and the video camera are identical to those in Embodiment 1. Basic portions of the image-stabilization processing procedure are identical to the processing procedure in Embodiment 1 described with FIG. 3. FIG. 9 shows a shake-correction parameter calculating step which represents a difference between the processing procedure of Embodiment 2 and that in Embodiment 1.

The processing at a normalization step of S901 is similar to the processing at the normalization step S501 of FIG. 5.

At an attitude amount calculating step of S902, the motion vectors between frames transformed into a normalized image coordinate system are used as input to calculate an image variation amount between the frames. An attitude variation amount of the camera determined between images is used as the index of the image variation amount.

In the following, two possible solutions for the attitude variation amount:

$$\{R_{x1}, R_{y1}, R_{z1}, t_{x1}, t_{y1}, t_{z1}, \vec{n}_1\}, \{R_{x2}, R_{y2}, R_{z2}, t_{x2}, t_{y2}, t_{z2}, \vec{n}_2\}$$

are calculated from the motion vectors between frames transformed into the normalized image coordinate system.

The two possible solutions for the attitude variation amount are calculated by using, for example, the method described in "Understanding Images—Mathematics of Three-Dimension Recognition," Kenichi Kanatani, Morikita Publishing Co., Ltd. In this case, corresponding points between frames are needed to be optical flow. That is, it is necessary that the camera attitude variation between frames represented by $\{R_x, R_y, R_z, t_x, t_y, t_z\}$ is extremely small. In other words, it is necessary that the frame rate of video is sufficiently high as compared with camera works and $\cos(R_i) \approx 0$, $\sin(R_i) \approx R_i$ are satisfied.

In the following expressions, a minute rotation $\{R_x, R_y, R_z\}$ is represented as $\{\omega_1, \omega_2, \omega_3\}$.

$$W = \begin{pmatrix} (2A-D)/3 & C & -E \\ B & (-A+2D)/3 & -F \\ U & V & -(A+D)/3 \end{pmatrix}$$

$$= -\frac{pa+qb-c}{3r} \begin{pmatrix} 1 & 0 & 0 \\ 0 & 1 & 0 \\ 0 & 0 & 1 \end{pmatrix} + \frac{1}{r} \begin{pmatrix} p \\ q \\ -1 \end{pmatrix} (a \ b \ c) +$$

$$\begin{pmatrix} 0 & -\omega_3 & \omega_2 \\ \omega_3 & 0 & -\omega_1 \\ -\omega_2 & \omega_1 & 0 \end{pmatrix}$$

A symmetric portion $W_s$ of W and an asymmetric portion $W_a$ thereof are defined as follows:

$$W_s = \frac{1}{2}(W + W^T)$$

$$W_a = \frac{1}{2}(W - W^T).$$

These have the following meanings, respectively:

$$W_s = \begin{pmatrix} (2A-D)/3 & (B+C)/2 & (U-E)/2 \\ (B+C)/2 & (-A+2D)/3 & (V-F)/2 \\ (U-E)/2 & (V-F)/2 & -(A+D)/3 \end{pmatrix}$$

$$= -\frac{pa+qb-c}{3r} \begin{pmatrix} 1 & 0 & 0 \\ 0 & 1 & 0 \\ 0 & 0 & 1 \end{pmatrix} + \frac{1}{2r}$$

$$\left[ \begin{pmatrix} p \\ q \\ -1 \end{pmatrix} (a \ b \ c) + \begin{pmatrix} a \\ b \\ c \end{pmatrix} (p \ q \ -1) \right]$$

$$W_a = \begin{pmatrix} 0 & -(B-C)/2 & -(U+E)/2 \\ (B-C)/2 & 0 & -(V+F)/2 \\ (U+E)/2 & (V+F)/2 & 0 \end{pmatrix}$$

$$= \frac{1}{2r} \left[ \begin{pmatrix} p \\ q \\ -1 \end{pmatrix} (a \ b \ c) + \begin{pmatrix} a \\ b \\ c \end{pmatrix} (p \ q \ -1) \right] +$$

$$\begin{pmatrix} 0 & -\omega_3 & \omega_2 \\ \omega_3 & 0 & -\omega_1 \\ -\omega_2 & \omega_1 & 0 \end{pmatrix}$$

These are used to provide solutions.

The eigenvalues of Ws are set to $\sigma 1 \geq \sigma 2 \geq \sigma 3 \geq 0$, and the corresponding eigenvectors $\{\vec{u}_1, \vec{u}_2, \vec{u}_3\}$ are set to unit vectors orthogonal to each other.

If $\sigma 1 = \sigma 2 = \sigma 3 = 0$, that is, $W_s = \vec{0}$ holds, then motion parameters are given as follows:

$$\begin{pmatrix} a \\ b \\ c \end{pmatrix} = \begin{pmatrix} 0 \\ 0 \\ 0 \end{pmatrix}$$

$$\begin{pmatrix} \omega_1 \\ \omega_2 \\ \omega_3 \end{pmatrix} = \begin{pmatrix} (V+F)/2 \\ -(U+E)/2 \\ (B-C)/2 \end{pmatrix}$$

and plane parameters $\{p, q, r\}$ are indefinite.

If not, the two possible solutions are determined as follows.

First, the gradient $\{p, q\}$ of a plane serving as the reference for calculating the image variation amount is determined with the following expressions:

$$p = \frac{p'}{l'}, \quad q = -\frac{q'}{l'}$$

$$\begin{pmatrix} p' \\ q' \\ r' \end{pmatrix} = \pm \sqrt{\sigma_1 - \sigma_2} \, \vec{u}_1 - \sqrt{\sigma_2 - \sigma_3} \, \vec{u}_3.$$

Next, a ratio of the translation speed (a, b, c) to the distance r is determined as follows:

$$\begin{pmatrix} a/r \\ b/r \\ c/r \end{pmatrix} = -l' \left( \pm \sqrt{\sigma_1 - \sigma_2} \, \vec{u}_1 + \sqrt{\sigma_2 - \sigma_3} \, \vec{u}_3 \right).$$

Finally, the rotation speed ($\omega 1, \omega 2, \omega 3$) is calculated as follows:

$$\begin{pmatrix} \omega_1 \\ \omega_2 \\ \omega_3 \end{pmatrix} = \begin{pmatrix} (V+F)/2 \\ -(U+E)/2 \\ (B-C)/2 \end{pmatrix} + \frac{1}{2} \begin{pmatrix} p & 0 & 0 \\ 0 & q & 0 \\ 0 & 0 & -1 \end{pmatrix} \begin{pmatrix} a/r \\ b/r \\ c/r \end{pmatrix}.$$

In addition, the following expressions hold:

$$\vec{n} = \{p/\sqrt{p^2+q^2+1}, q/\sqrt{p^2+q^2+1}, -1/\sqrt{p^2+q^2+1}\}$$

$$d = -r/\sqrt{p^2+q^2+1}.$$

With the abovementioned processing, the two possible solutions for the attitude variation amount $\{R_{x1}, R_{y1}, R_{z1}, t_{x1}, t_{y1}, t_{z1}, \vec{n}_1\}$, $\{R_{x2}, R_{y2}, R_{z2}, t_{x2}, t_{y2}, t_{z2}, \vec{n}_2\}$ are calculated. The shift of the coordinate system with (a, b, c) and (ω1, ω2, ω3) is represented as follows:

$$\dot{X} = \begin{pmatrix} -\omega_1 \\ -\omega_2 \\ -\omega_3 \end{pmatrix} \times X - \begin{pmatrix} a \\ b \\ c \end{pmatrix}$$

where × represents multiplication of elements.

Thus, the rotation matrix is approximated as follows:

$$R \cong \begin{bmatrix} 1 & -\omega_3 & \omega_2 \\ \omega_3 & 1 & -\omega_1 \\ -\omega_2 & \omega_1 & 1 \end{bmatrix}.$$

Based on this relationship, for the two possible solutions $\{R_1, \vec{t}_1/d, \vec{n}_1\}$, $\{R_2, \vec{t}_2/d, \vec{n}_2\}$ for the attitude variation and scene information provided by resolution of the homography determined from the corresponding points $\vec{x}_1, \vec{x}_2$, the Epipolar error represented by:

$$e_i = \sum_j^n (\vec{x}_2^{j\,T} ([\vec{t}_i]_\times R_i) \vec{x}_1^j), i=1,2, j=1,2,\ldots,n$$

is calculated with the corresponding points. A set with less error is selected as a true set represented by $\{R_x, R_y, R_z, t_x, t_y, t_z\}$.

At a homography calculating step of S903, the homography is calculated as follows from the attitude variation amount $\{R_x, R_y, R_z, t_x, t_y, t_z\}$ which is the image variation amount determined between the frames:

$$H = \left( R + \frac{1}{d} \vec{t}\,\vec{n}^T \right) \text{ where}$$

$$R \cong \begin{bmatrix} 1 & -\omega_3 & \omega_2 \\ \omega_3 & 1 & -\omega_1 \\ -\omega_2 & \omega_1 & 1 \end{bmatrix}.$$

The processing at a correction amount calculating step of S904 is similar to the processing at the correction amount calculating step S504 in FIG. 5.

In Embodiment 2, the processing step with the abovementioned changes made to Embodiment 1 is performed to apply image-stabilization processing to each frame of the video signal. Thus, Embodiment 2 has the advantage of providing the same effects as those in the method of Embodiment 1 through simple processing when slight motion changes occur between the frames.

The abovementioned time-series filtering in Embodiment 2 is performed by using the digital filtering. However, another filtering method may be used to separate image variation amounts produced due to an intended camera work and an unintended camera shake.

Embodiment 3

Figure 10:
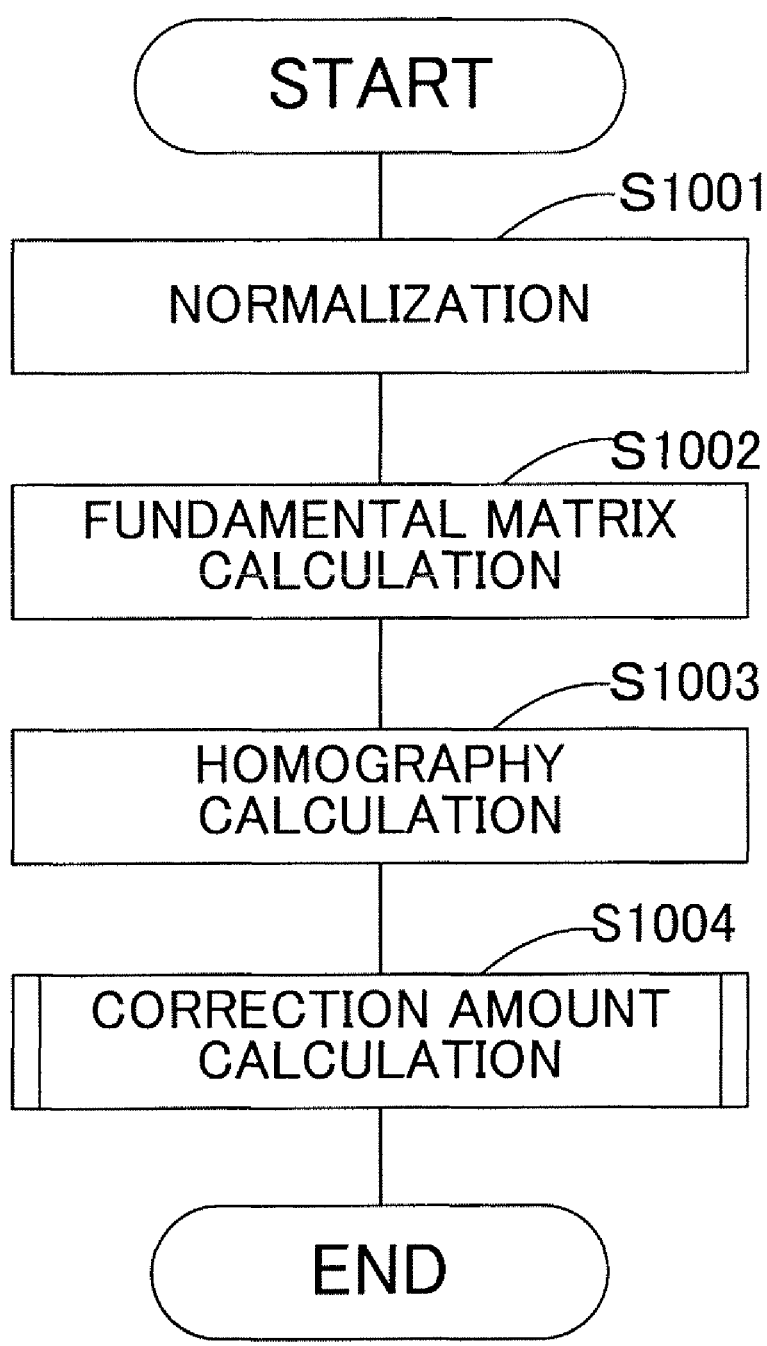
FIG. 10 is a flow chart showing a correction amount calculating procedure in Embodiment 3.

An image stabilizing apparatus which is Embodiment 3 and a video camera including the apparatus will hereinafter be described. The configurations of the image stabilizing apparatus and the video camera are identical to those in Embodiment 1. Basic portions of the image-stabilization processing procedure are identical to the processing procedure in Embodiment 1 described with FIG. 3. FIG. 10 shows a shake-correction parameter calculating step which represents a difference between the processing procedure of Embodiment 3 and that in Embodiment 1.

The processing at a normalization step of S1001 is similar to the processing at the normalization step S501 of FIG. 5.

At a fundamental matrix calculating step of S1002, the motion vectors between the frames transformed into the normalized image coordinate system are used as input to calculate an image variation amount between the frames. A fundamental matrix E determined between images is used as the index of the image variation amount. The fundamental matrix E is calculated by using information on corresponding points $\vec{x}_1, \vec{x}_2$ between the frames.

Specifically, assuming that $\vec{x}_1 = [x,y,1]^T$ and $\vec{x}_2 = [x',y',1]^T$, a linear equation:

$$A\vec{e} = \begin{bmatrix} x'^1 x^1 & x'^1 y^1 & x'^1 & x'^1 x^1 & y'^1 y^1 & y'^1 & x^1 & y^1 & 1 \\ \vdots & \vdots & \vdots & \vdots & \vdots & \vdots & \vdots & \vdots & \vdots \\ x'^n x^n & x'^n y^n & x'^n & x'^n x^n & y'^n y^n & y'^n & x^n & y^n & 1 \end{bmatrix} \vec{e} = \vec{0}$$

is formed. It is overdetermined if the number n of the corresponding points is equal to or larger than eight, and the vector form of the fundamental matrix represented by (9×1) $\vec{e}$ can be obtained in the least-square manner. The vector form $\vec{e}$ is shaped into a 3×3 matrix form to provide the fundamental matrix E.

At a homography calculating step of S1003, the projective homography is calculated from the fundamental matrix which represents the image variation amount determined between the frames and the corresponding points in the normalized coordinates used in the calculation of the fundamental matrix. The fundamental matrix E between the frames is formed with camera work rotation R and translation $\vec{t}$ between the frames as follows:

E=[T]$_x$R where $[\vec{t}]_\times$ represents a torsional symmetric vector of the translation vector $\vec{t}$:

$$[\vec{t}]_\times = \begin{bmatrix} 0 & -t_Z & t_Y \\ t_Z & 0 & -t_X \\ -t_Y & t_X & 0 \end{bmatrix}.$$

The fundamental matrix is resolved by using a singular value resolution USV$^T$=SVD(X). S represents a matrix having a singular value in diagonal elements, and U and V represent matrices formed of a singular vector corresponding to the singular value. Further, the following expressions hold:

$$R_1 = U * \begin{bmatrix} 0 & 1 & 0 \\ -1 & 0 & 0 \\ 0 & 0 & 1 \end{bmatrix} * V^T, \quad R_2 = U * \begin{bmatrix} 0 & -1 & 0 \\ 1 & 0 & 0 \\ 0 & 0 & 1 \end{bmatrix} * V^T$$

$$\vec{t} = \vec{v}_3$$

where $\vec{v}_3$ is the singular vector of the third column of V

The fundamental matrix E has indetermination for scale. Thus, a redundant scale component of E is ignored when and $|\vec{t}|=1$ are set. As a result, $\vec{t}$ represents a direction vector indicating the direction of the translation. Since the indetermination of the sign occurs, four solutions are possible for the translation and the rotation. In this case, one solution is selected by adding $R \geqq 0$ and the depth positive constraint as follows:

$$n\text{sign} = \sum_{i=1}^{n} \text{sign}(x_2^{iT}([T]_x R)x_1^i)$$

where sign( ) represents a function for calculating +1 if the numerical value is the parentheses is positive, −1 if the value is negative, or −1 if the value is zero.

The sign of the direction vector $\vec{t}$ is not changed if nsign is positive or it is inversed if nsign is negative.

Next, the homography is calculated. If the only one solution set of the attitude variation represented by $\{R, \vec{t}\}$ is determined from the fundamental matrix, the information is used to calculate the homography excluding an appearance variation component (image variation due to the shear and foreshortening caused by the translation). To exclude the appearance variation component, $\vec{n} = \vec{e}_3 = [0,0,1]^T$ is defined.

Then, an insufficient element d is determined from the relationship between the projective homography, and camera work $\{R, \vec{t}\}$ and scene information $\{d, \vec{n}\}$. Specifically, the product d of the reference plane distance in the depth direction and the translation magnitude is determined so as to minimize sum represented by the following expression:

$$\text{sum} = \sum_{i=1}^{n} \left( x_2^{iT} \left( R + \frac{1}{d} \vec{n} \vec{t}^T \right) x_1^i \right)^2.$$

As a result, the projective homography H in which the appearance variation component was excluded and which depends on the distribution of the corresponding points is determined from the following relational expression, the fundamental matrix, and the corresponding points used in the calculation thereof:

$$H = R + \frac{1}{d} \vec{e}_3 \vec{t}^T.$$

The processing at a correction amount calculating step of S1004 is similar to the processing at the correction amount calculating step of S504 in FIG. 5.

In Embodiment 3, the processing step with the abovementioned changes made to Embodiment 1 is performed to apply image-stabilization processing to each frame of the video signal.

The shake-correction parameter calculating method in Embodiment 3 has the property of instability if the corresponding points in a scene input at the shake-correction parameter calculating step are distributed on a single plane. In contrast, the shake-correction parameter calculating method in Embodiment 1 has the property of instability if the corresponding points in a scene are uniformly distributed in a wide depth range. In other words, Embodiments 3 and 1 have the complementary properties.

Figure 11:
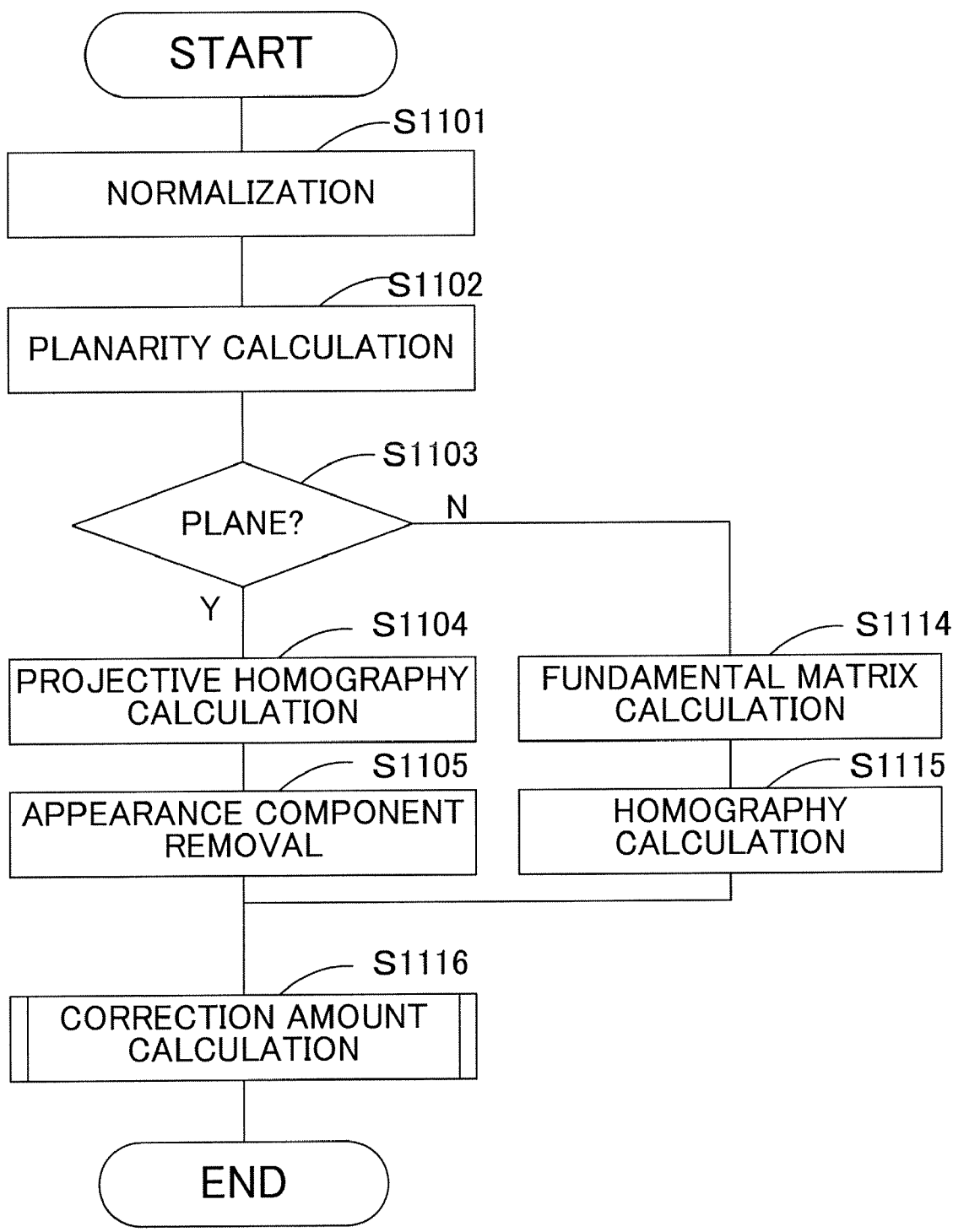
FIG. 11 is a flow chart showing a shake correction parameter calculating procedure in Embodiment 3.

The properties may be utilized. For example, FIG. 11 shows a procedure of shake-correction parameter calculation which involves investigation of planarity of normalized corresponding point distribution (that is, planarity of spatial distribution of motion vector points) before calculation of an image variation amount, and involves switching of processing in response to the result of the investigation.

The processing at a normalization step of S1101 is similar to the processing at the normalization step of S501 in FIG. 5 of Embodiment 1.

At a planarity calculating step of S1102, the projective homography is calculated from the corresponding points to investigate fitting of the reference plane in space determined by the projective homography and the distribution of the corresponding points in space with planarity. The corresponding points between the frames are defined as $\vec{x}_1, \vec{x}_2$ and planarity P is calculated with the following expression:

$$P = \sum_{i=1}^{n} (\vec{x}_2^{iT} H \vec{x}_1^i)^2, \quad i = 1, \ldots n$$

where H represents the projective homography determined from the corresponding points and n represents the number of the corresponding points.

Then, a threshold value th is set. If P is equal to or smaller than th, it is determined that the corresponding points are distribution in a planar manner. If P is larger than th, it is determined that the corresponding points are distributed in a non-planar manner.

When the corresponding point distribution is close to planar distribution in space, the control proceeds to the projective homography calculating step of S1104 in Embodiment 1. Then, the shake correction parameters are calculated by using the projective homography as the index of the image variation amount. In contrast, if the corresponding point distribution is not close to planar distribution, the control proceeds to a fundamental matrix calculating step of S1114 in the shake-correction parameter calculating method of this embodiment. Then, the shake correction parameters are calculated by using the fundamental matrix as the index of the image variation amount.

Thereafter, in S1105, S1115, and S1116, the shake correction parameters are calculated with the shake-correction parameter calculating step of Embodiment 1 or this embodiment. If the absolute amount of the motion is small, the method based on the fundamental matrix in Embodiment 3 readily causes error. For this reason, the index of the absolute amount of motion may be used additionally in the determination of the planarity. As the index of the absolute amount of motion, the mean square of displacement of the corresponding points between the frames may be used, for example.

According to Embodiment 3, it is possible to preserve a motion due to an intended camera work included in video picked up by a video camera having an image-pickup optical system of a very short focal length and to effectively suppress an image shake due to an unintended camera shake. Especially for video in a deep scene and a widely moving scene, stable image-stabilization processing result can be achieved.

The abovementioned time-series filtering in Embodiment 3 is performed by using the digital filtering. However, another filtering method may be used to separate the image variation amounts produced due to an intended camera work and an unintended camera shake.

Embodiment 4

Figure 12:
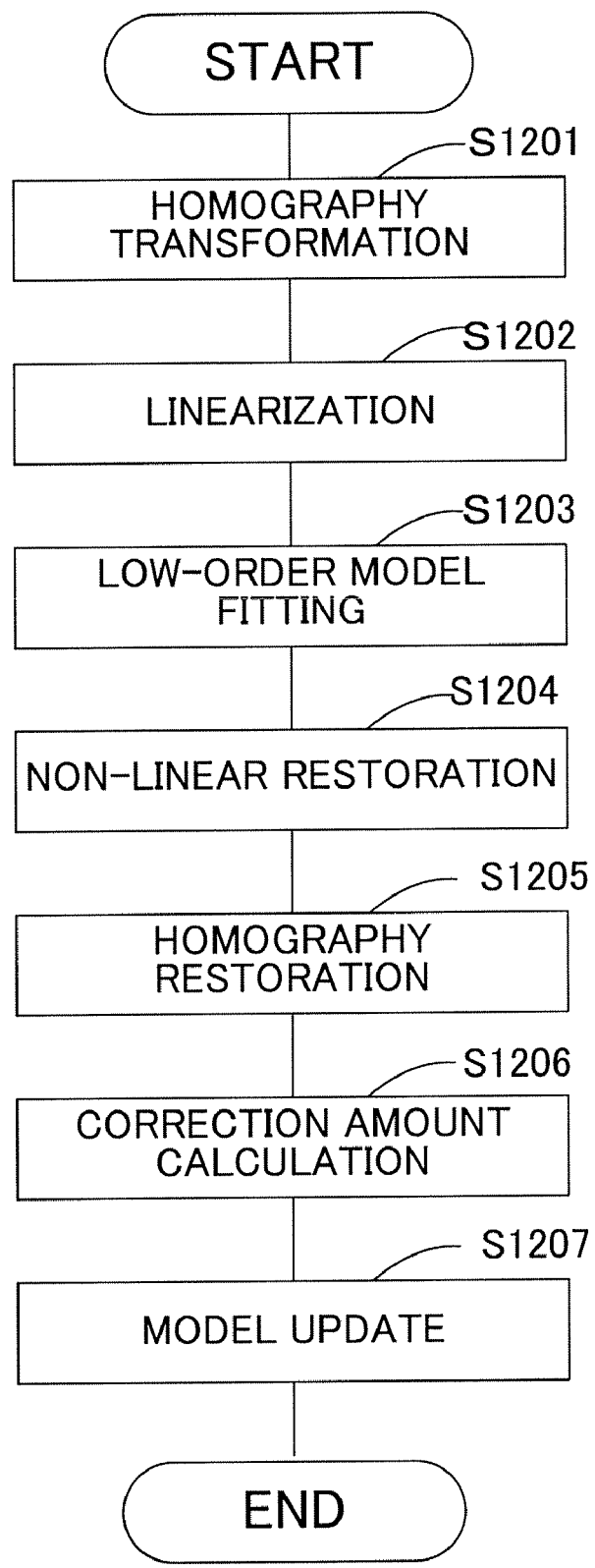
FIG. 12 is a flow chart showing a correction amount calculating procedure in Embodiment 4.

An image stabilizing apparatus which is Embodiment 4 and a video camera including the apparatus will hereinafter be described. The configurations of the image stabilizing apparatus and the video camera are identical to those in Embodiment 1. Basic portions of the image-stabilization processing procedure are identical to the processing procedure in Embodiment 1 described with FIGS. 3 and 5. FIG. 12 shows a shake-correction amount calculating step which represents a difference between the processing procedure of Embodiment 4 and that in Embodiment 1.

In Embodiment 4, filtering in calculating a correction amount is performed through low-order model fitting. First, the image variation amount between the input frames is handled as an observation value including noise of an unintended camera work mixed into the result of an intended camera work. The intended camera work formed of motion at low frequency is modeled with a low-order model. Then, the observation value is filtered through the fitting. The low-order model is sequentially updated with a Kalman filter.

In Embodiment 4, the image variation amount between the frames is used as input. The projective homography in which the appearance variation component was excluded is used as the image variation amount.

At a homography transforming step of S1201, the input projective homography is transformed and resolved into component representation similar to the camera works. The filtering using the low-order model fitting allows input of a multi-dimensional amount series. However, if non-linearity is present in the correspondence between the camera works and the input multi-dimensional amount, the filtering with the low-order model fitting and the model update with the Kalman filter are not performed successfully. To prevent this problem, the step involves processing of resolution into linearly changing terms and non-linearly changing terms for the camera works.

The input projective homography between the frames is represented by the following expression if the scale component is normalized with h9=1:

$$H = \begin{bmatrix} h_1 & h_2 & h_3 \\ h_4 & h_5 & h_6 \\ h_7 & h_8 & 1 \end{bmatrix}.$$

When each term of the projective homography is compared with the camera work (triaxial rotation and triaxial translation), camera works (advancing, in-plane rotation, panning, and tilting) influencing the 2×2 terms on the upper left are mixed. As a result, if these camera works occur simultaneously, non-linear influence causes the possibility that the filtering and the model update are not performed successfully. Thus, the transformation of the input projective homography into image variation components (horizontal translation, vertical translation, scaling, in-plane rotation, shear, horizontal foreshortening, and vertical foreshortening), which are similar to the camera works, is performed by the following expression:

$$H = H_S H_A H_P = \begin{bmatrix} sR & \vec{t} \\ \vec{0}^T & 1 \end{bmatrix} \begin{bmatrix} K & \vec{0} \\ \vec{0}^T & 1 \end{bmatrix} \begin{bmatrix} I & \vec{0} \\ \vec{v}^T & 1 \end{bmatrix} = \begin{bmatrix} A & \vec{t} \\ \vec{v}^T & 1 \end{bmatrix}$$

where $A = RK + \vec{t}\vec{v}^T$.

Then, $RK = A - \vec{t}\vec{v}^T$ is calculated, and R and K are resolved by qr resolution using the property of K that is an upper triangular matrix.

This achieves the resolution of the input projective homography into eight parameters including horizontal translation tx, vertical translation ty, scaling s, rotation θ, anisotropic magnification α of shear, direction angle φ of shear, horizontal foreshortening vx, and vertical foreshortening vy. $\vec{t}, \vec{v}, R$ and K are expressed as follows:

$$\vec{t} = [t_x, t_y]^T$$
$$\vec{v} = [v_x, v_y]^T$$
$$R = \begin{bmatrix} \cos\theta & -\sin\theta \\ \sin\theta & \cos\theta \end{bmatrix}$$
$$K = \begin{bmatrix} \alpha & \tan\phi \\ 0 & 1 \end{bmatrix}.$$

In this manner, the input projective homography is transformed into a set of one-dimensional time-series amounts representing the image variation amount between the frames as follows:

$[t_x, t_y, s, \theta, \alpha, \phi, v_x, v_y]^i$, i=1, . . . ,k.

A linearization step of S1202 involves removing the remaining non-linearity and the influence of the scaling component upon the horizontal and vertical foreshortening components after the transformation into the image variation components similar to the camera works. Because of the order of the above-mentioned resolution calculation, the foreshortening component is influenced by the scaling component if the parameters are seen from the viewpoint of appearance on the image. When a camera work relating to scaling and a camera work relating to foreshortening occur simultaneously, a non-linear parameter change may be caused. Thus, calculations of vx'=svx and vy'=svy are performed to remove the influence of the scaling from the foreshortening component.

S1203 is a step for performing the filtering with the low-order model fitting. In Embodiment 4, a constant-velocity model is used as a variation model of the image variation amount. Thus, a constant-velocity variation of the component of the image variation amount is included in the intended motion. As a result, a larger variation than the constant-velocity variation can be discriminated as an unintended image variation amount.

First, the Kalman filter is used to efficiently perform the sequential state model update and filtering. To use the Kalman filter, the following state space model representing time series is built as follows:

$x_{n+1} = F_n x_n + G_n v_n$ (system model)

$y_n = H_n x_n + w_n$ (observation model)

where $x_n$ represents a vector of k dimension which cannot be directly observed and is called a 'state', vn represents system noise that is m-dimensional normalized white noise according to an average vector of 0 and a variance-covariance matrix $Q_n$, $w_n$ represents observation noise that is one-dimensional normalized white noise according to the average vector of 0 and a variance-covariance matrix $R_n$, and $F_n$, $G_n$, $H_n$ respectively represent matrixes of k×k, k×m, and l×k.

A system model of the constant-velocity model is defined with a state variable x and a velocity variable Δx (x:$t_x$,$t_y$,s,θ,α,ϕ,$v_x$,$v_y$). The velocity variable is an inside parameter which is not exposed.

A velocity variation element is handled as white Gaussian noise N(0,σ) which represents a white Gaussian noise with average zero and variance σ.

First, a system model for one component is represented as follows:

$$\begin{bmatrix} x \\ \Delta x \end{bmatrix}^{n+1} = \begin{bmatrix} 1 & 1 \\ 0 & 1 \end{bmatrix} \begin{bmatrix} x \\ \Delta x \end{bmatrix}^n + \begin{bmatrix} 0 \\ N(0, \sigma) \end{bmatrix}.$$

Thus, a state space system model for all of the input image variation amount components is given as follows:

$$\begin{bmatrix} t_x \\ t_y \\ s \\ \theta \\ \alpha \\ \phi \\ v_x \\ v_y \\ \Delta t_x \\ \Delta t_y \\ \Delta s \\ \Delta \theta \\ \Delta \alpha \\ \Delta \phi \\ \Delta v_x \\ \Delta v_y \end{bmatrix}^{t+1} = \begin{bmatrix} 1 & & & & & & & & 1 & & & & & & & \\ & 1 & & & & & & & & 1 & & & & & & \\ & & 1 & & & & & & & & 1 & & & & & \\ & & & 1 & & & & & & & & 1 & & & & \\ & & & & 1 & & & & & & & & 1 & & & \\ & & & & & 1 & & & & & & & & 1 & & \\ & & & & & & 1 & & & & & & & & 1 & \\ & & & & & & & 1 & & & & & & & & 1 \\ & & & & & & & & 1 & & & & & & & \\ & & & & & & & & & 1 & & & & & & \\ & & & & & & & & & & 1 & & & & & \\ & & & & & & & & & & & 1 & & & & \\ & & & & & & & & & & & & 1 & & & \\ & & & & & & & & & & & & & 1 & & \\ & & & & & & & & & & & & & & 1 & \\ & & & & & & & & & & & & & & & 1 \end{bmatrix} \begin{bmatrix} t_x \\ t_y \\ s \\ \theta \\ \alpha \\ \phi \\ v_x \\ v_y \\ \Delta t_x \\ \Delta t_y \\ \Delta s \\ \Delta \theta \\ \Delta \alpha \\ \Delta \phi \\ \Delta v_x \\ \Delta v_y \end{bmatrix}^t + \begin{pmatrix} N(0, \sigma_{t_x}) \\ N(0, \sigma_{t_y}) \\ N(0, \sigma_s) \\ N(0, \sigma_\theta) \\ N(0, \sigma_\alpha) \\ N(0, \sigma_\phi) \\ N(0, \sigma_{v_x}) \\ N(0, \sigma_{v_y}) \end{pmatrix}.$$

An observation model for each parameter is represented as follows:

$$\begin{bmatrix} \tilde{t}_x \\ \tilde{t}_y \\ \tilde{s} \\ \tilde{\theta} \\ \tilde{\alpha} \\ \tilde{\phi} \\ \tilde{v}_x \\ \tilde{v}_y \end{bmatrix} = \begin{pmatrix} t_x \\ t_y \\ s \\ \theta \\ \alpha \\ \phi \\ v_x \\ v_y \end{pmatrix} + \begin{pmatrix} N(0, \sigma_{t_x}^{obs}) \\ N(0, \sigma_{t_y}^{obs}) \\ N(0, \sigma_s^{obs}) \\ N(0, \sigma_\theta^{obs}) \\ N(0, \sigma_\alpha^{obs}) \\ N(0, \sigma_\phi^{obs}) \\ N(0, \sigma_{v_x}^{obs}) \\ N(0, \sigma_{v_y}^{obs}) \end{pmatrix}$$

where $\tilde{x}$ represents an observation value, and N(0,σxobs) represents white Gaussian observation noise for the x component. The white Gaussian observation noise component represents an unintended motion. The variance of the observation noise and the variance of the system noise are adjusted to allow adjustment of smoothness of camera motions.

The abovementioned system model and observation model are represented in the matrix form of the state space model as follows:

$$F = \begin{bmatrix} I_{8\times 8} & I_{8\times 8} \\ 0_{8\times 8} & I_{8\times 8} \end{bmatrix} \quad G = \begin{bmatrix} 0_{8\times 8} \\ I_{8\times 8} \end{bmatrix} \quad H = [I_{8\times 8} \; 0_{8\times 8}].$$

In addition, the following can be assumed:

$Q = \sigma^{sys} I_{8\times 8}$ $R = \sigma^{obs} I_{8\times 8}$.

Thus, the sequential update of the model (x(t+1|t)←x(t|t)) is performed with x=Fx and P=FPF$^T$+GQG$^T$.

The filtering results (x(t|t)←x(t|t−1),P(t|t)←P(t|t−1) are obtained from the following expressions:

$K = PH^T/(HPH^T + R)$ $x_{fil} = x + K(y_{obs} - Hx)$ $y_{fil} = Hx_{fil}$.

That is, the filtering value represented by $y_{fil} = [t_{xy}, t_y, s, \theta, \alpha, \phi, v'_x, v'_y]^T$ is provided as an intended motion component from the current frame. The difference between the current frame and the predicted value can be provided as a value to be a correction amount.

At a non-linearity restoration step of S1204, the image variation amount component deformed to provide the linear change for the camera work is transformed to provide the original non-linear component. In Embodiment 4, the foreshortening term is restored with the following:

$vx = vx'/s$ $vy = vy'/s$.

A homography restoration step of S1205 is a step for restoring the image variation amount, which has been transformed into the image variation amount components similar to the camera works, to the representation of the homography. The one-dimensional amount set of the filtering result represented by $[t_x, t_x, s, \theta, \alpha, \phi, v_x, v_y]_{filter}$ is transformed with the following expression:

$$H_{filter} = \begin{bmatrix} sR & \vec{t} \\ \vec{0}^T & 1 \end{bmatrix} \begin{bmatrix} K & \vec{0} \\ \vec{0}^T & 1 \end{bmatrix} \begin{bmatrix} I & \vec{0} \\ \vec{v}^T & 1 \end{bmatrix}$$

where $\vec{t} = [t_x, t_y]^T$, $\vec{v} = [v_x, v_y]^T$, $$R = \begin{bmatrix} \cos\theta & -\sin\theta \\ \sin\theta & \cos\theta \end{bmatrix}, \text{ and } K = \begin{bmatrix} \alpha & \tan\phi \\ 0 & 1 \end{bmatrix}.$$

A correction amount calculating step of S1206 is a step for calculating a projective matrix serving as an shake correction amount. A difference between an image variation amount $H_{filter}$ between the frames restored from the filtering result and the image variation amount H between the target frame and the past frame is calculated as the shake correction amount.

When delay is not considered, an image motion $H^i$ between the target frame and the past frame input to calculate $H_{filter}^i$ is used as the target frame. If the shake correction amount is represented by $H_{stb}$, it is calculated with:

$$H_{stb}^i = H_{filter}^i (H^i)^{-1}$$

where i represents the frame number between the current frame and the past frame.

If delay is present, the shake correction amount between the frames is calculated with:

$$H_{stb}^{i'} = H_{filter}^{i-delay}(H^{i'})^{-1}$$

where i represents the frame number between the current frame and the past frame and delay represents the delay amount when the relationship i'=i−delay is satisfied. When no delay is present, delay=0 holds in the above expression.

A model update step of S1207 is a step for updating the state space model. Typically, the filtering is performed on the accumulated variation amount series from an arbitrary reference frame to extract a low-frequency variation amount component or a high-frequency variation amount component. The reference frame is typically an initial frame.

However, if image stabilization is performed during movement of a user with the initial frame used as the reference, the accumulated variation amount component of scaling which non-linearly changes for a camera work readily becomes an extremely small (large) value if an advancing (backing) movement is included. As a result, a minute variation component cannot be filtered.

To prevent this problem, the start frame of the current frame and the past frame is used as the reference frame of the accumulated variation amount. In other words, update is performed such that the reference frame of the state variable of the state space model is shifted.

Specifically, the reference frame of the state variable is shifted by one frame with the image variation amount between the current frame and the past frame used for updating the state space model. First, the state variable represented by $\{t_x, t_y, s, \theta, \alpha, \phi, v'_x, v'_y\}$ is restored to the projective homography $H_{state}$. Then, the processing of canceling the change of the image variation amount between the current frame and the past frame is performed with the following expression:

$$H_{state} = H_{state}H^{-1}.$$

The projective homography $H_{state}$ is again resolved to the state variable term represented by $\{t_x, t_y, s, \theta, \alpha, \phi, v'_x, v'_y\}$. As a result, even when the image variation amount between the current frame and the past frame is input in the filtering, the result is given as if the accumulated variation amount was input to perform the filtering.

The filtering and the correction amount calculation with the low-order model fitting as described above are repeated to calculate the shake correction amount for the frame.

According to Embodiment 4, it is possible to preserve a motion due to an intended camera work included in video picked up by a video camera having an image-pickup optical system of a very short focal length and to effectively suppress an image shake due to an unintended camera shake. With the processing of Embodiment 4, the image stabilizing degree can be adjusted seamlessly from a full image stabilization state to a non-image stabilization state only by adjusting the Kalman filter coefficient.

While Embodiment 4 has been described of the case where the image variation amount calculating step similar to that in Embodiment 1 is performed, the image variation amount calculating step described in Embodiments 2 and 3 may be used.

Embodiment 5

Figure 13:
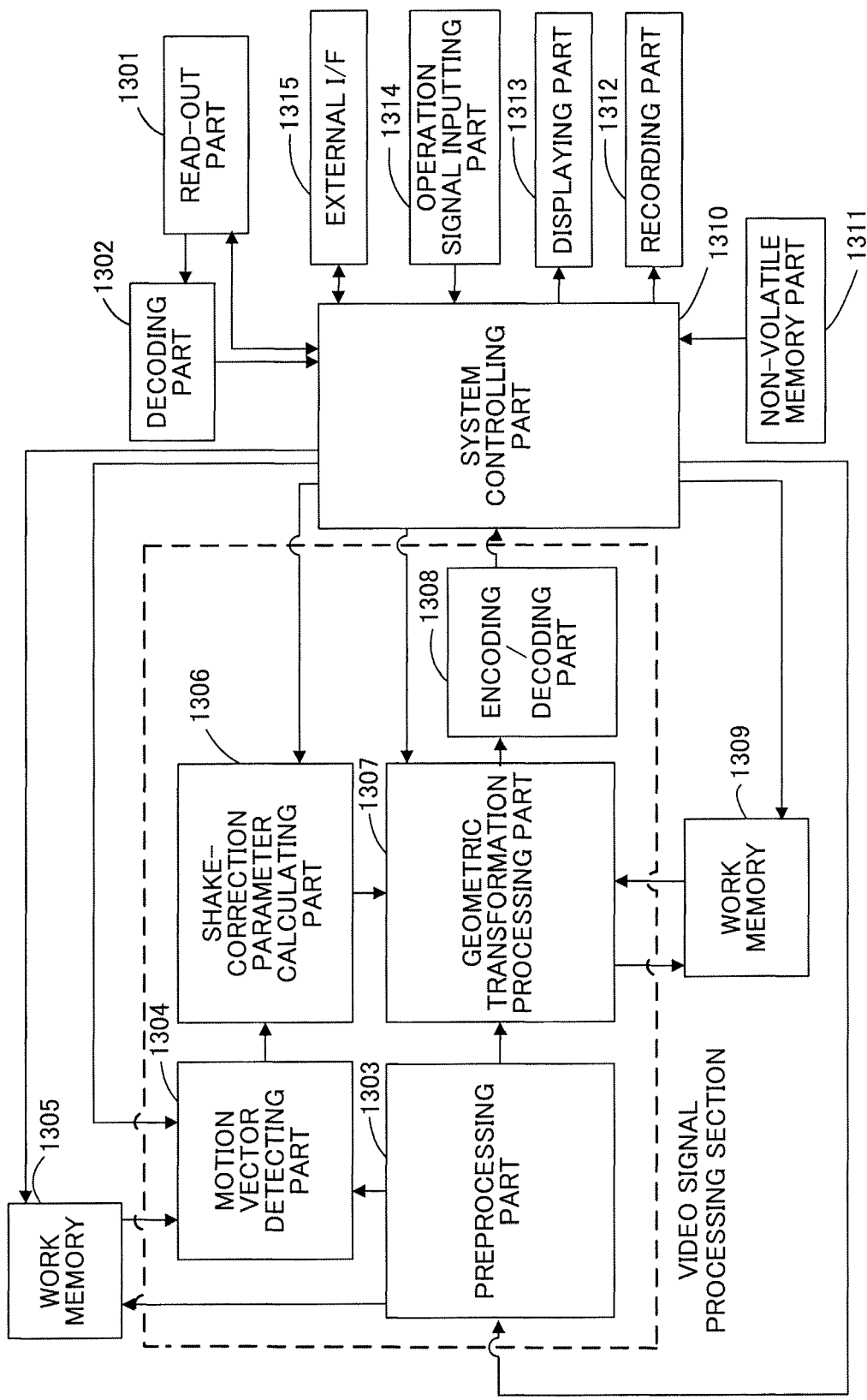
FIG. 13 is a diagram showing the configuration of an image stabilizing apparatus which is Embodiment 5.

FIG. 13 shows the configuration of an image stabilizing apparatus which is Embodiment 5 of the present invention. The image stabilizing apparatus is not mounted on a video camera but is formed to function alone and is realized by a personal computer or the like. For example, a computer program for executing each processing described below is installed on the personal computer, so that the personal computer can be used as the image stabilizing apparatus.

In FIG. 13, reference numeral 1301 shows a read-out part, 1302 a decoding part, 1303 a preprocessing part, 1304 a motion vector detecting part, and 1305 a work memory. Reference numeral 1306 shows a shake-correction parameter calculating part, 1307 a geometric transformation processing part, 1308 an encoding/decoding part, and 1309 a work memory. Reference numeral 1310 a system controlling part, 133 a non-volatile memory part, 1312 a recording part, 1313 a displaying part, 1314 an operation signal inputting part, and 1315 an external I/F.

The preprocessing part 1303, the motion vector detecting part 1304, the shake-correction parameter calculating part 1306, the geometric transformation processing part 1307, and the encoding/decoding part 1308 constitute a video signal processing part.

The read-out part 1301 is formed of a mechanism for reading a video signal and image-pickup information including inside parameters of a camera used in an image-pickup operation from a recording medium such as a semiconductor memory, a magnetic tape, and an optic disk.

The video signal is sent to the decoding part 1302, while the image-pickup information is sent to the system controlling part 1310.

The decoding part 1302 decodes the video signal read by the read-out part 1301 if it is an encoded signal.

The preprocessing part 1303 performs video processing for detecting a motion vector on the image-pickup signal output from the decoding part 1302. The video processing performed by the preprocessing part 130 includes, for example, gain adjustment, gamma adjustment, luminance/color difference separation, sharpening, white balance adjustment, black level adjustment, calorimetric system transformation, and coding.

The motion vector detecting part 1204 receives, as input, video frames such as successive luminance frames, luminance and color difference frames, or RGB frames transformed from the luminance and color difference frames provided by the preprocessing part 1303. It may receive, as input, differential processing frames processed for motion vector detection or binary code frames.

The motion vector detecting part 1304 detects the motion vector between successive frames input thereto. Specifically, it calculates motion vectors between a current frame input from the preprocessing part 1303 and a past frame input previously and accumulated in the work memory 1305. The past frame is a frame subsequent to the current frame or a much order frame.

The work memory 1305 is formed of a FIFO memory, for example.

The shake-correction parameter calculating part 1306 receives, as input, the motion vector output from the motion vector detecting part 1304 and camera calibration information such as in-camera parameters and a distortion coefficient provided by the system controlling part 1310 to calculate a shake correction amount.

The in-camera parameters include a focal length, a pixel size, and an offset, and a shear amount similarly to Embodiment 1. The distortion coefficient represents a distortion amount due to aberration of a lens optical system similarly to Embodiment 1.

The shake-correction parameter calculating part 1306 outputs shake correction parameters including the calculated shake correction amount, the in-camera parameters, and the distortion coefficient.

The geometric transformation processing part 1307 receives, as input, the shake correction parameters calculated by the shake-correction parameter calculating part 1306 and the corresponding video frames to perform geometric transformation processing of the video frames. As described in Embodiment 1, the shake correction parameters may be subjected to filtering processing or the like before the processing to this part 1307, so that they may be delayed relative to the corresponding video frames. In this case, the video frames are once passed through the work memory 1309 to match the video frames with the shake correction parameters. The work memory 1309 is a FIFO memory similar to the work memory 1305.

The encoding/decoding part 1308 encodes the video frame signal successively output from the geometric transformation processing part 1307 in a video format such as NTSC and MPEG4. To reproduce a recorded and encoded video signal, the encoding/decoding part 1308 decodes the video signal read out from the recording part 1312 and displays it on the displaying part 1313.

The system controlling part 1310 transmits a read-out instruction to the read-out part 130 to start reading of the video signal and the image-pickup information. The system controlling part 1310 takes the image-pickup information and control parameters in image-pickup operation. The control parameters include the in-camera parameters, a lookup table or a transforming expression showing the relationship between a zoom state and a focal length, and a lookup table or a transforming expression showing the relationship between a focal length and a distortion coefficient.

The focal length information or zoom state information for the video signal has a format of a time-series signal or for recording the state at the time of change and takes a form in which the focal length of all of the frames is restorable.

The system controlling part 1310 transmits the video information decoded by the decoding part 1302 to the preprocessing part 1303. It also sends the video signal encoded in the abovementioned video format and output from the encoding/decoding part 1308 to the recording part 1312 for recording.

The system controlling part 1310 also controls parameters for the processing blocks such as the motion vector detecting part 1304, the shake-correction parameter calculating part 1306, the geometric transformation processing part 1307, and the encoding/decoding part 1308. Initial values of the parameters are read out from the non-volatile memory part 1311. The various parameters are displayed on the displaying part 1313 and the values of the parameters can be changed with the operation signal inputting part 1314 or a GUI.

The system controlling part 1310 holds control parameters such as the number of the motion vectors, a search range of the motion vectors, and a template size for the motion vector detecting part 1304. The system controlling part 1310 provides the geometric transformation processing part 1307 with control parameters such as the shake correction parameters calculated by the shake-correction parameter calculating part 1306, and the inside parameters and distortion coefficient used in the calculation. The system controlling part 1310 provides the encoding/decoding part 1308 with control parameters such as the encoding method and the compression rate.

The system controlling part 1310 performs control of the work memories 1305 and 1309 to control the delay amount of output.

The system controlling part 1310 matches the video sequence with the image-pickup information. Specifically, it reads a zoom value representing a zoom state and uses the lookup table or the transforming expression showing the relationship between the zoom value and the focal length provided as the image-pickup information to acquire a focal length of the optical system in an arbitrary zoom state.

As described in Embodiment 1, the distortion coefficient varies depending on the focal length. Thus, the system controlling part 1310 also calculates the distortion coefficient corresponding to the focal length. It uses the lookup table or the transforming expression showing the relationship between the focal length and the distortion coefficient provided from the image-pickup information to calculate the distortion coefficient at an arbitrary focal length. In addition, the system controlling part 1310 takes and holds the in-camera parameters other than the focal length from the image-pickup information.

The inside parameters other than the focal length f include pixel sizes ku, kv in horizontal and vertical directions, a shear amount φ, and offset amounts u0, v0 in horizontal and vertical directions. The inside parameters are provided from camera design specifications or camera calibration. The system controlling part 1310 transmits the inside parameters and the distortion coefficient to the shake-correction parameter calculating part 1306.

The non-volatile memory part 1311 stores the initial values of the control parameters necessary to system control for the motion vector detecting part 1304, the shake-correction calculating part 1306, the encoding/decoding part 1308, the preprocessing part 1303 and the like. The control parameters are read out by the system controlling part 1310.

The recording part 1312 performs writing (recording) and reading (reproduction) of the video signal encoded by the encoding/decoding part 1308 to and from a recording medium on which the video signal can be recorded such as a semiconductor memory, a magnetic tape, and an optical disk.

The displaying part 1313 is formed of a display element such as an LCD, an LED, and an EL. The displaying part 1313 performs, for example, parameter setting display, alarm display, display of picked-up video data, and display of recorded video data read by the recording part 1312. In reproducing the recorded video data, the displaying part 1313 reads the encoded video signal from the recording part 1312 and transmits the read signal to the encoding/decoding part 1308 via the system controlling part 1310. The recorded video data after it is decoded is displayed on the displaying part 1313.

The operation signal inputting part 1314 includes setting buttons for performing selection of functions of the image stabilizing apparatus and various settings from the outside and a button for directing start and end of image-stabilization processing. The operation signal inputting part 1314 may be integrated with the displaying part 1313 by using a touch panel display method.

The external I/F 1315 receives an input signal from the outside instead of an operation signal input from the operation signal inputting part 1314 or outputs the encoded video signal to an external device. The external I/F 1315 is realized with an I/F protocol such as USB, IEEE1394, and wireless LAN. It can receive from the outside a video signal including information necessary for image stabilization such as the focal length or the zoom state in image-pickup operation, the in-camera parameters, and the distortion coefficient to allow image-stabilization processing of recorded video.

The procedure of image-stabilization processing in Embodiment 5 is identical to that in Embodiment 1. However, in Embodiment 5, the video information and the image-pickup information read out by the recording part 1312 are used to perform image-stabilization processing on the recorded video information. Then, the video stream after the image-stabilization processing is encoded in the video format such as NTSC and MPEG4 by the encoding/decoding part 1308. The encoded video stream is again recorded on the recording medium by the recording part 1312.

It is thus possible to preserve a motion due to an intended camera work included in video picked up previously by a video camera having an image-pickup optical system of a very short focal length and to effectively suppress an image shake due to an unintended camera shake.

While the image variation amount calculating step identical to that in Embodiment 1 is performed in Embodiment 5, the image variation amount calculating step described in Embodiments 2 and 3 may be used. While the time-series filtering identical to that in Embodiment 1 is performed, another filtering method may be used. For example, the filtering may be performed with the low-model fitting described in Embodiment 4.

The image-stabilization processing in Embodiment 5 can be performed not only on the video information recorded on the recording medium but also on video information recorded and saved across a network connected through the external I/F.

Embodiment 6

An image stabilizing apparatus which is Embodiment 6 and a video camera including the apparatus will hereinafter be described. Since the configurations of the image stabilizing apparatus and the video camera are identical to those in Embodiment 1, components identical to those in Embodiment 1 are designated with the same reference numerals as those in Embodiment 1. Basic portions of the image-stabilization processing procedure are identical to the processing procedure in Embodiment 1 described with FIGS. 3 and 5.

Figure 14:
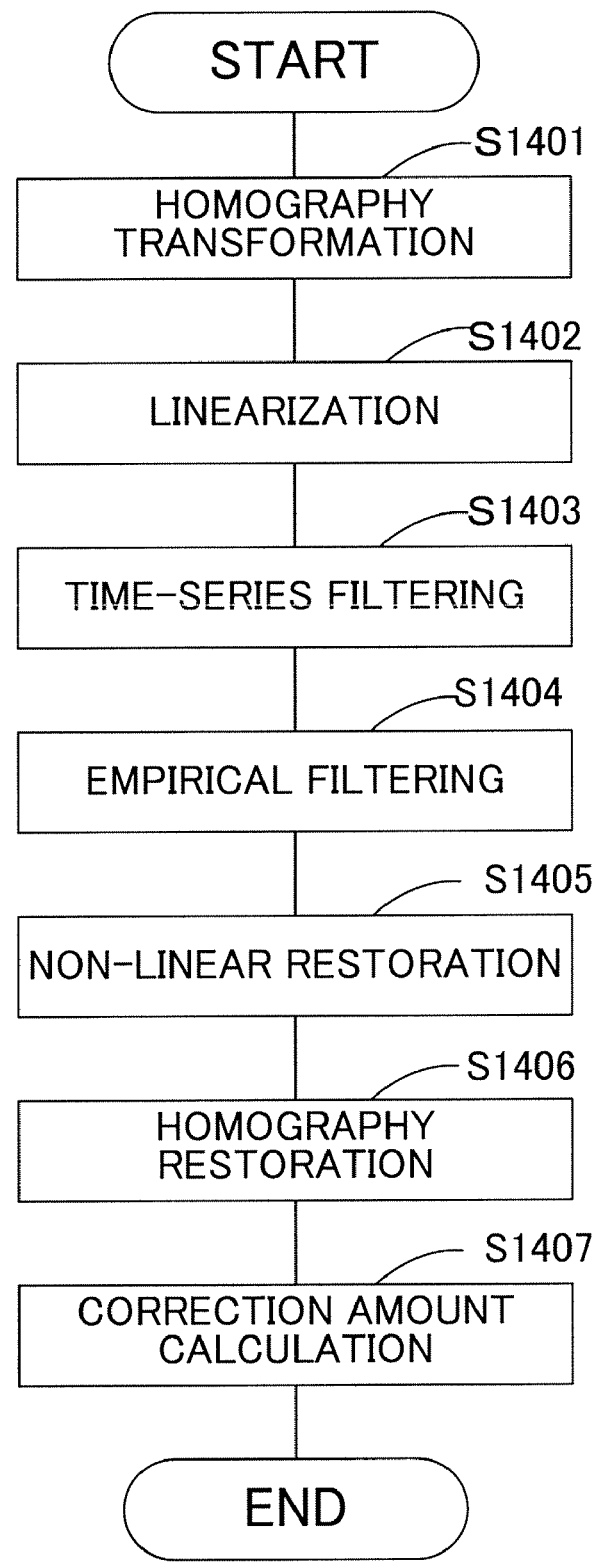
FIG. 14 is a flow chart showing a correction amount calculating procedure in Embodiment 6.

FIG. 14 shows a shake-correction amount calculating step which represents a difference between the processing procedure of Embodiment 6 and that in Embodiment 1.

Processing at a homography transforming step of S1401 is identical to the processing at the homography transforming step of Embodiment 1. The processing at a linearization step of S1402 is also identical to the processing at the linearization step of Embodiment 1. The processing at a time-series filtering step of S1404 is also identical to the filtering processing step of Embodiment 1.

At an empirical filtering of S1404, filtering with empirical knowledge of camera works in video is performed on a set of image variation amount components output from the time-series filtering step of S1403 and represented by $\{t_x, t_y, s', \theta, \alpha, \phi, v'_x, v'_y\}^{out}$. The empirical knowledge is input, for example, by presenting a menu on the displaying part 114 and operating the operation signal inputting part 115.

Figure 15:
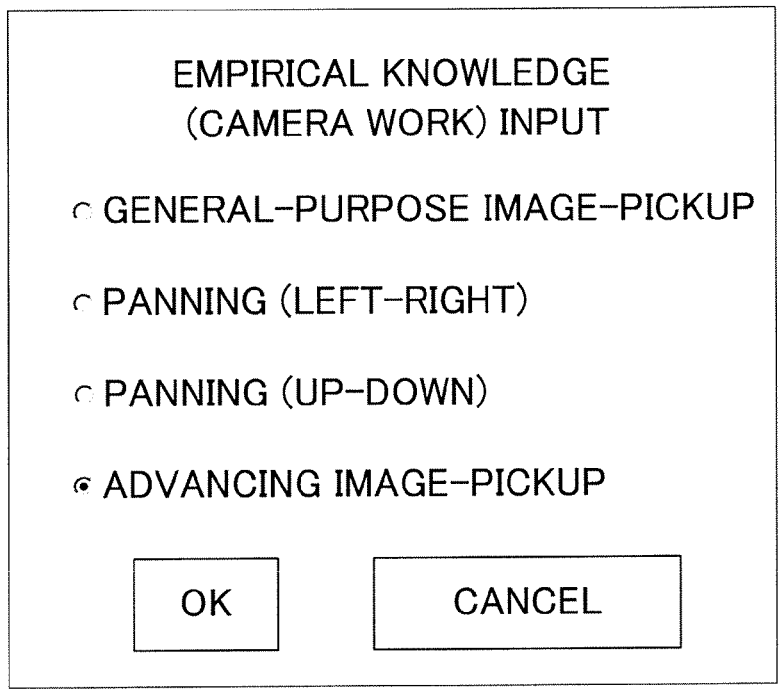
FIG. 15 is a diagram showing an exemplary display menu in Embodiment 6.
Figure 16:
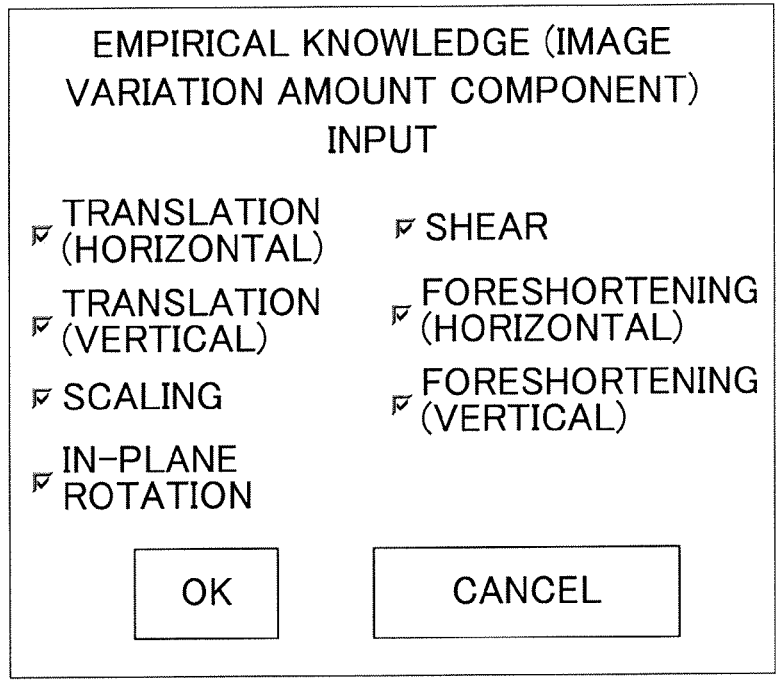
FIG. 16 is a diagram showing another exemplary display menu in Embodiment 6.

FIG. 15 shows an example of the image-stabilization menu presented on the displaying part 114. As the image-stabilization menu, the state of a camera work in video is selected with a button and is confirmed with an OK button. The image-stabilization menu may be formed as shown in FIG. 16 in which an image variation amount can be directly determined. The result is sent to the system controlling part 110. The initial value (image-pickup mode) is recorded on the non-volatile memory part 112. For example, the initial value is set to normal image-pickup.

For example, when empirical knowledge of wishing a stabilized image including only a restored forward camera work is selected as the image-pickup mode, intended image variation amounts other than scaling are assumed to be absent.

Specifically, the filtering represented as:

$t_x=0$
$t_y=0$
$s=s$
$\theta=0$
$\alpha=0$
$\phi=0$
$v_x=0$
$v_y=0$ is performed. In other words, the filtering is performed on the set of the image variation amount components after the time-series filtering such that only the image motion of scaling remains in the video.

Processing at a non-linear restoration step of S1405 is identical to the processing at the non-linear restoring step of Embodiment 1. Processing at a homography restoring step of S1406 is also identical to the processing at the homography restoring step of Embodiment 1. Processing at a correction amount calculating step of S1405 is also identical to the processing at the correction amount calculating step of Embodiment 1.

According to Embodiment 6, it is thus possible to preserve a motion due to an intended camera work included in video picked up by a video camera having an image-pickup optical system of a very short focal length and to effectively suppress an image shake due to an unintended camera shake. In addition, it is possible to provide video resulting from image-stabilization processing performed only on a particular image motion (shake).

While Embodiment 6 has been described in conjunction with the empirical filtering performed on the result of the time-series filtering, the empirical filtering may be performed before the time-series filtering.

The time-series filtering may not be performed but only the empirical filtering may be performed.

The empirical filtering coefficient may be a continuous value from zero to one, not a binary value of one or zero.

While the image variation amount calculating step identical to that in Embodiment 1 is performed in Embodiment 6, the image variation amount calculating step described in Embodiments 2 and 3 may be used. While the time-series filtering identical to that in Embodiment 1 is performed, another filtering method may be used. For example, the filtering may be performed with the low-model fitting described in Embodiment 4.

Embodiment 7

Figure 17:
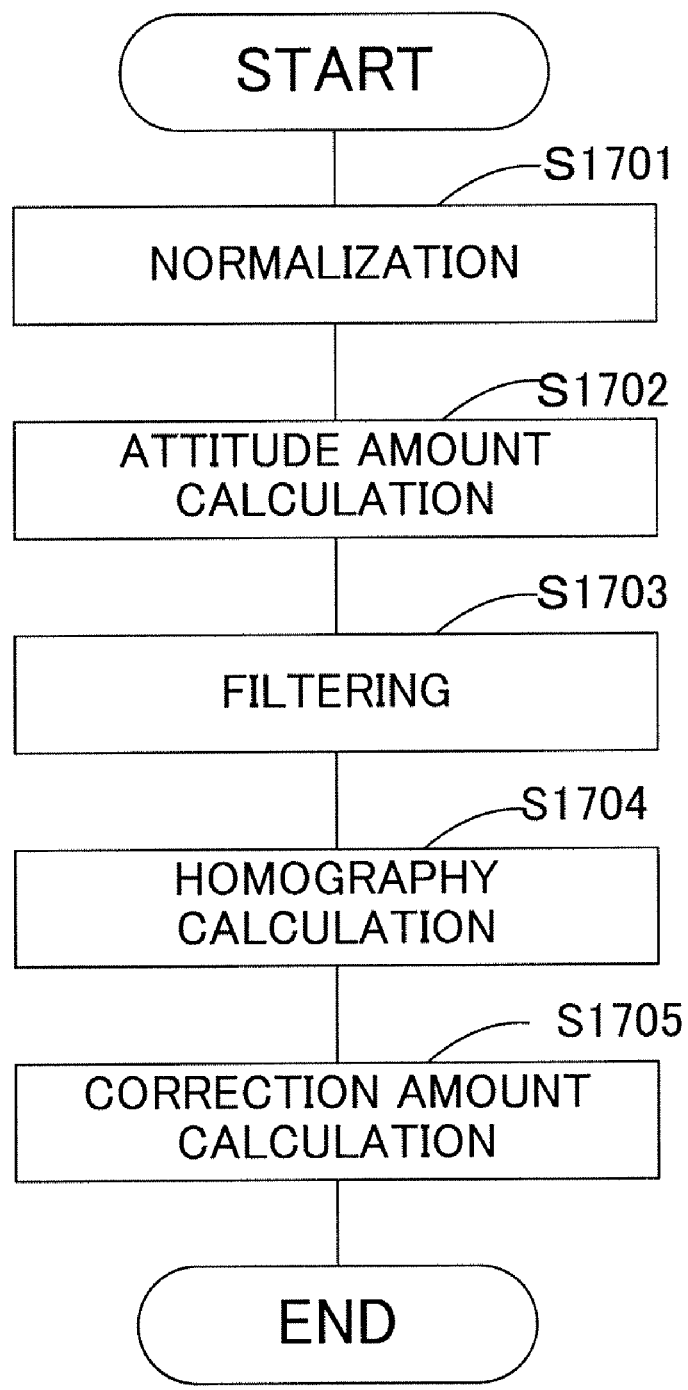
FIG. 17 is a flow chart showing a shake correction parameter calculating procedure in Embodiment 7.

An image stabilizing apparatus which is Embodiment 7 and a video camera including the apparatus will hereinafter be described. Since the configurations of the image stabilizing apparatus and the video camera are identical to those in Embodiment 1. Basic portions of the image-stabilization processing procedure are identical to the processing procedure in Embodiment 2 described with FIG. 9. FIG. 17 shows a shake-correction parameter calculating step which represents a difference between the processing procedure of Embodiment 7 and that in Embodiment 2.

Processing at a normalization step of S1701 is identical to the processing at the normalization step of S1901 described with FIG. 9 in Embodiment 2.

At an attitude amount calculating step of S1702, motion vectors between frames transformed into a normalized image coordinate system are used as input to calculate an image variation amount between the frames. An attitude variation amount of a camera determined between the frames is calculated as the index of the image variation amount. In other words, the same processing as that at the attitude amount calculating step described in Embodiment 2 is performed.

At a filtering step of S1703, time-series data of the camera attitude variation between the frames represented by $\{R_x, R_y, R_z, t_x, t_y, t_z\}$ is formed and filtering is performed. The filtering is performed with digital filtering identical to that in Embodiment 1.

At a homography calculating step of S1704, a homography is calculated from the attitude variation amount which is the image variation amount determined between the frames and the filtering result.

Specifically, the attitude variation amount as the image variation amount determined between the frames represented by $\{R_x, R_y, R_z, t_x, t_y, t_z\}$ is used to calculate the homography H that is represented by:

$$H = \left(R + \frac{1}{d}\vec{t}\vec{n}^T\right)$$

where $$R \cong \begin{bmatrix} 1 & -\omega_3 & \omega_2 \\ \omega_3 & 1 & -\omega_1 \\ -\omega_2 & \omega_1 & 1 \end{bmatrix}.$$

In this manner, the homography representing the image variation amount before and after the filtering is performed.

Processing at a correction amount calculating step of S1705 is identical to the processing at the correction amount calculating step of Embodiment 1. A shake correction amount is calculated by using the image variation amount restored from the filtering result $H_{acc\_filter}{}^i$ a filter and the accumulated variation amount $H_{acc}{}^i$ of the image variation amount to the target frame, the accumulated variation amount corresponding to the target frame as a result of the delay.

According to Embodiment 7, it is thus possible to preserve a motion due to an intended camera work included in video picked up by a video camera having an image-pickup optical system of a very short focal length and to effectively suppress an image shake due to an unintended camera shake. In addition, Embodiment 7 can realize the image stabilization with simpler processing than those of the methods of other embodiments.

While the time-series filtering identical to that of Embodiment 1 is performed in Embodiment 7, another filtering method may be used. For example, the filtering may be performed on the one-dimensional signal time-series with the low-model fitting described in Embodiment 4.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-101162, filed on Apr. 6, 2007, which is hereby incorporated by reference herein in its entirety.

What is claimed is:

1. An image stabilizing apparatus comprising:
a motion vector calculating part that calculates a motion vector between a plurality of images including a displacement caused by a motion of an image-pickup apparatus;
a shake-correction parameter calculating part that receives the motion vector as input to calculate a shake correction amount; and
an image transforming part that performs geometric transformation of the image in accordance with the shake correction amount,
wherein the shake-correction parameter calculating part includes:
a variation amount calculating part that calculates an image variation amount between the plurality of images based on the motion vector;
a variation amount correcting part that calculates, based on the image variation amount, motion information in which a component distorting the image is excluded; and
a correction amount calculating part that calculates the shake correction amount based on the motion information between the plurality of images.

2. The image stabilizing apparatus according to claim 1, wherein the image variation amount is a homography, and
wherein the shake-correction parameter calculating part changes a direction of a normal to a reference plane of the homography.

3. The image stabilizing apparatus according to claim 2, wherein the shake-correction parameter calculating part changes the direction of the normal to the reference plane such that the normal is directed in parallel with a normal to an image plane before the displacement.

4. The image stabilizing apparatus according to claim 1, wherein the image variation amount is associated with rotation and translation, and
wherein the shake-correction parameter calculating part calculates the motion information based on information on the rotation and translation.

5. The image stabilizing apparatus according to claim 4, wherein the shake-correction parameter calculating part changes a reference plane such that the reference plane is directed in parallel with an image plane before the displacement.

6. The image stabilizing apparatus according to claim 1, wherein the correction amount calculating part performs filtering for outputting the shake correction amount based on the motion information.

7. The image stabilizing apparatus according to claim 1, wherein the variation amount calculating part selects, as the image variation amount to be calculated, one of a homography and an image variation amount associated with rotation and translation by investigating planarity of a spatial distribution of detection points of a plurality of the motion vectors.

8. The image stabilizing apparatus according to claim 1, wherein the shake-correction amount calculating part transforms the motion information into components of horizontal translation, vertical translation, scaling, in-plane rotation, shear, horizontal foreshortening, and vertical foreshortening, and
  wherein the shake-correction amount calculating part performs logarithmic transformation of the scaling component and then filtering thereon, and performs exponential transformation of the filtering result to restore the image variation amount.

9. The image stabilizing apparatus according to claim 1, wherein the shake-correction amount calculating part transforms the motion information into components of horizontal translation, vertical translation, scaling, in-plane rotation, shear, horizontal foreshortening, and vertical foreshortening, and
  wherein the shake-correction amount calculating part multiplies the foreshortening component by the scaling component and then performs filtering on the scaling component as the product thereof, and uses the filtering result to restore the image variation amount.

10. An image-pickup apparatus comprising:
  an image-pickup system that photoelectrically converts an object image to produce a plurality of frame images constituting video; and
  the image stabilizing apparatus according to claim 1.

11. An image stabilizing apparatus comprising:
  a motion vector calculating part that calculates a motion vector that represents displacement of corresponding feature portions between a plurality of images, the displacement being caused by a motion of an image-pickup apparatus;
  a shake-correction parameter calculating part that receives the motion vector as input to calculate a shake correction amount; and
    an image transforming part that performs geometric transformation of the image in accordance with the shake correction amount,
  wherein the shake-correction parameter calculating part includes:
    a variation amount calculating part that calculates an image variation amount between the plurality of images based on the motion vector,
  the image variation amount is associated with rotation and translation;
  a variation amount correcting part that calculates motion information based on the image variation amount between the plurality of images; and
    a correction amount calculating part that calculates the shake correction amount based on the motion information,
    wherein the shake-correction parameter calculating part calculates a homography based on information on the rotation and translation.

12. An image-pickup apparatus comprising:
  an image-pickup system that photoelectrically converts an object image to produce a plurality of frame images constituting video; and
  the image stabilizing apparatus according to claim 11.

13. An image stabilizing apparatus comprising:
  a motion vector calculating part that calculates a motion vector that represents displacement of corresponding feature portions between a plurality of images, the displacement being caused by a motion of an image-pickup apparatus;
    a shake-correction parameter calculating part that receives the motion vector as input to calculate a shake correction amount; and
    an image transforming part that performs geometric transformation of the image in accordance with the shake correction amount,
  wherein the shake-correction parameter calculating part includes:
    a variation amount calculating part that calculates an image variation amount between the plurality of images based on the motion vector, the image variation amount is a fundamental matrix;
  a variation amount correcting part that calculates motion information based on the image variation amount between the plurality of images; and
    a correction amount calculating part that calculates the shake correction amount based on the motion information,
    wherein the shake-correction parameter calculating part calculates the motion information based on the fundamental matrix.

14. An image-pickup apparatus comprising:
an image-pickup system that photoelectrically converts an object image to produce a plurality of frame images constituting video; and
the image stabilizing apparatus according to claim 13.

15. An image-stabilizing method comprising:
  a motion vector calculating step of calculating a motion vector between a plurality of images including a displacement caused by a motion of an image-pickup apparatus;
  a shake-correction parameter calculating step of receiving the motion vector as input to calculate a shake correction amount; and
  an image transforming step of performing geometric transformation of the image in accordance with the shake correction amount,
  wherein the shake-correction parameter calculating step includes:
  a variation amount calculating step of calculating an image variation amount between the plurality of images based on the motion vector;
  a variation amount correcting step of calculating, based on the image variation amount, motion information in which a component distorting the image is excluded; and
  a correction amount calculating step of calculating the shake correction amount based on the motion information between the plurality of images.

16. A storage media storing a computer program that causes a computer to perform processing corresponding to the image-stabilizing method according to claim 15.

17. An image-stabilizing method comprising:
  a motion vector calculating step of calculating a motion vector that represents displacement of corresponding feature portions between a plurality of images, the displacement being caused by a motion of an image-pickup apparatus;
    a shake-correction parameter calculating step of receiving the motion vector as input to calculate a shake correction amount; and an image transforming step of performing geometric transformation of the image in accordance with the shake correction amount, wherein the shake-correction parameter calculating step includes:

a variation amount calculating step of calculating an image variation amount between the plurality of images based on the motion vector, the image variation amount is associated with rotation and translation;

a variation amount correcting step of calculating motion information based on the image variation amount between the plurality of images; and a correction amount calculating step of calculating the shake correction amount based on the motion information, wherein the shake-correction parameter calculating part calculates a homography based on information on the rotation and translation.

18. A storage media storing a computer program that causes a computer to perform processing corresponding to the image-stabilizing method according to claim 17.

19. An image-stabilizing method comprising:

a motion vector calculating step of calculating a motion vector that represents displacement of corresponding feature portions between a plurality of images, the displacement being caused by a motion of an image-pickup apparatus;

a shake-correction parameter calculating step of receiving the motion vector as input to calculate a shake correction amount; and an image transforming step of performing geometric transformation of the image in accordance with the shake correction amount, wherein the shake-correction parameter calculating step includes:

a variation amount calculating step of calculating an image variation amount between the plurality of images based on the motion vector, the image variation amount is a fundamental matrix;

a variation amount correcting step of calculating motion information based on the image variation amount between the plurality of images; and a correction amount calculating step of calculating the shake correction amount based on the motion information;

wherein the shake-correction parameter calculating part calculates the motion information based on the fundamental matrix.

20. A storage media storing a computer program that causes a computer to perform processing corresponding to the image-stabilizing method according to claim 19.

* * * * *